United States Patent
Goncalves et al.

(10) Patent No.: US 10,810,465 B2
(45) Date of Patent: Oct. 20, 2020

(54) SYSTEMS AND METHODS FOR ROBUST INDUSTRIAL OPTICAL CHARACTER RECOGNITION

(71) Applicant: Datalogic USA, Inc., Eugene, OR (US)

(72) Inventors: Luis Goncalves, Pasadena, CA (US); Mauro Belgiovine, Pasadena, CA (US)

(73) Assignee: DATALOGIC USA, INC., Eugene, OR (US)

( * ) Notice: Subject to any disclaimer, the term of this patent is extended or adjusted under 35 U.S.C. 154(b) by 212 days.

(21) Appl. No.: 16/024,910

(22) Filed: Jul. 1, 2018

(65) Prior Publication Data

US 2019/0138853 A1 May 9, 2019

Related U.S. Application Data

(60) Provisional application No. 62/528,021, filed on Jun. 30, 2017.

(51) Int. Cl.
| | |
|---|---|
| *G06K 9/62* | (2006.01) |
| *G06N 3/08* | (2006.01) |
| *G06K 9/03* | (2006.01) |
| *G06K 9/20* | (2006.01) |
| *G06N 3/04* | (2006.01) |

(52) U.S. Cl.
CPC ........... *G06K 9/6262* (2013.01); *G06K 9/03* (2013.01); *G06K 9/2054* (2013.01); *G06K 9/6267* (2013.01); *G06N 3/04* (2013.01); *G06N 3/088* (2013.01); *G06K 9/6256* (2013.01); *G06K 2209/01* (2013.01)

(58) Field of Classification Search
CPC .... G06K 9/626; G06K 9/6262; G06K 9/2054; G06K 9/2063; G06K 9/6256; G06K 9/6257
USPC .............. 382/155–157, 309–310, 321, 317, 382/181–183, 185–187, 198, 200, 382/289–292, 301
See application file for complete search history.

(56) References Cited

U.S. PATENT DOCUMENTS

| | | | | |
|---|---|---|---|---|
| 5,444,779 | A * | 8/1995 | Daniele ................. | G03G 21/02 358/462 |
| 2008/0025608 | A1* | 1/2008 | Meunier ............ | G06K 9/00449 382/181 |

(Continued)

OTHER PUBLICATIONS

What is the Difference Between a Neural Network and an Autoencoder Network?, https://www.quora.com/What-is-the-difference-between-a-neural-network-and an-autoencoder-network.

(Continued)

*Primary Examiner* — Dwayne D Bost
*Assistant Examiner* — Stephen M Brinich
(74) *Attorney, Agent, or Firm* — Stoel Rives LLP

(57) ABSTRACT

An auto-encoder is configured to verify character detection and/or classification results generated by an automated optical character recognition system. The auto-encoder may be trained to reconstruct visual representations of the detected character, and a determination of whether the character detection result comprises a true positive or false positive may be based on a reconstruction error between the image data in which the character was detected and a reconstructed image generated by the auto-encoder.

20 Claims, 12 Drawing Sheets

(56) References Cited

U.S. PATENT DOCUMENTS

| | | |
|---|---|---|
| 2008/0063276 A1* | 3/2008 | Vincent .................. G06K 9/03 382/182 |
| 2015/0339543 A1 | 11/2015 | Campanelli et al. |
| 2016/0034773 A1 | 2/2016 | Goncalves |
| 2016/0155136 A1 | 6/2016 | Zhang et al. |
| 2016/0350655 A1 | 12/2016 | Weiss et al. |
| 2017/0039470 A1 | 2/2017 | Hirayama et al. |
| 2018/0181826 A1 | 6/2018 | Goncalves et al. |

OTHER PUBLICATIONS

Vincent, et al., Extracting and Composing Robust Features with Denoising Autoencoders, Appearing in Proceedings of the 25th International Conference on Machine Learning, Helsinki, Finland, 2008.

Vincent, et al., Stacked Denoising Autoencoders: Learning Useful Representations in a Deep Network with a Local Denoising Criterion, Journal of Machine Learning Research 11 (2010) 3371-3408.

* cited by examiner

SYSTEMS AND METHODS FOR ROBUST INDUSTRIAL OPTICAL CHARACTER RECOGNITION

CROSS REFERENCE TO RELATED APPLICATIONS

The Application Data Sheet (ADS) filed herewith is incorporated by reference. This application claims the benefit of U.S. Provisional Patent Application No. 62/528,021, filed Jun. 30, 2017, which is hereby incorporated by reference to the extent such subject matter is not inconsistent with this disclosure.

TECHNICAL FIELD

The present disclosure generally relates to computer vision, and in particular relates to optical character recognition in industrial environments.

BACKGROUND

Optical character recognition (OCR) is the mechanical or electronic conversion of scanned or photographed images of alphanumeric or other characters into machine-encoded/computer-readable alphanumeric or other characters. OCR is used as a form of data entry from an original data source, which may include, but is not limited to: product packaging, labeling, printed material, books, receipts, and/or any object having characters printed and/or inscribed thereon.

OCR is frequently used in many computer vision systems to detect text associated with various industrial processes. For example, OCR may be used to verify that a label has been correctly printed on product packaging. In a specific implementation, OCR may be used to verify the presence of a "best before date" or "expiration date" on a product label (e.g., a label that identifies the date by which a product should be consumed and/or after which a product should be considered unsuitable for consumption). Typically, inkjet printers are used to write the best before date on the otherwise pre-printed packages since inkjet printers represent a mature and reliable technology, are capable of printing at high speeds, and are relatively low cost. Nevertheless, occasionally errors may occur in the printing process (e.g., low contrast, missing characters), which compels verification that the labels are printed correctly.

Setting up OCR parameters for a given application can be very difficult, especially for inexperienced users. Unlike many applications, which can be solved in advance by a system integrator, present OCR systems can require technicians or engineers to be present on the production floor to train or modify the runtime parameters, which causes a significant expenditure of time and expense. Further, the OCR parameters of a system may need to be adjusted when new parts or products are introduced, or when new printing systems or labels are used. For existing systems, if the default OCR segmentation parameters do not allow the OCR system to perform at a suitable level, the user may be confronted with a list of parameters (e.g., 20-30 parameters) that might require adjustment. Adjusting these parameters may require significant training and/or experience. Moreover, OCR systems can suffer from errors due to false positives and/or "confusable characters," particularly in deployments where there are limited data available to train the OCR system. Some applications of OCR, such as industrial inspection, are particularly sensitive to false positives. Extensive training of such systems may not be practical (e.g., due to lack of available training data, as mentioned above). Therefore, what is needed are systems and methods to further increase the accuracy and robustness of OCR systems by, inter alia, providing an independent evaluator of classification results of such systems to reduce the occurrence of false positives, disambiguate between conflicting classification results, and/or the like. Additional aspects and advantages will be apparent from the following detailed description of preferred embodiments, which proceeds with reference to the accompanying drawings.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1A:
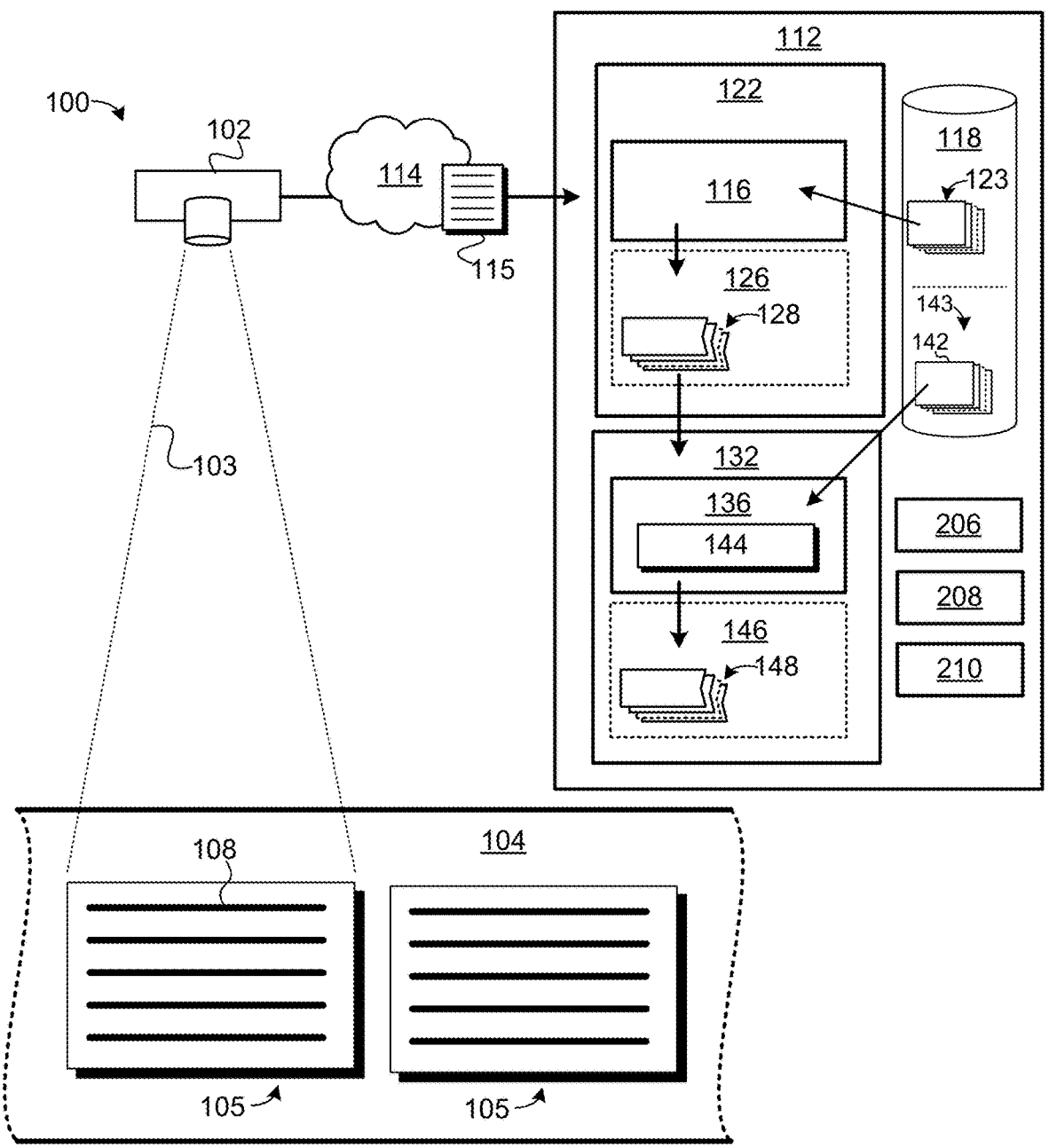
FIG. 1A is a schematic block diagram of one embodiment of an OCR system, according to at least one disclosed embodiment.

As disclosed above, OCR systems can suffer from errors due to false positives and/or "confusable characters," particularly where there are limited training data available.

Therefore, what is needed are systems and methods to further increase the accuracy of OCR systems by, inter alia, providing an independent evaluator of classification results of such systems.

Disclosed herein are systems and methods for improving the accuracy and/or robustness of an OCR system. Embodiments of the disclosed methods may comprise: receiving a classifier result indicating detection of a character at specified coordinates within the image; retrieving input image data corresponding to the specified coordinates within the image; generating a reconstruction of the input image data by use of an auto-encoder trained to replicate the detected character; and determining whether the classifier result is a true positive based on a reconstruction error between the input image data and the reconstruction of the input image data. Generating the reconstruction of the input image data may comprise processing the input image data through a plurality of encoder layers of the auto-encoder to produce an inner layer representation of the input image data, and decoding the inner layer representation by use of a plurality of decoder layers of the auto-encoder to generate the reconstruction of the input image data from the inner layer representation. Embodiments of the disclosed methods may further include calculating the reconstruction error between the input image data and reconstructed image data generated by the auto-encoder. The reconstruction error may comprise a root-mean-square error between the input image data and the reconstructed image data.

In some embodiments, the disclosed method further comprises acquiring a plurality of different sets of input image data corresponding to the classifier result; generating a plurality of reconstruction images by use of the auto-encoder, each reconstruction image corresponding to a respective one of the different sets of input image data; calculating a plurality of reconstruction errors, each reconstruction error between a respective one of the different sets of the input image data and corresponding reconstruction image; and determining whether the classification result comprises a true positive based on a minimum reconstruction error of the plurality of reconstruction errors. Generating the plurality of different sets of input image data comprises retrieving respective sets of input image data from the image within an enlarged area around the specified coordinates, the enlarged area corresponding to a size of one or more ground-truth images used to train the auto-encoder. The classifier result may be invalidated in response to the reconstruction error exceeding a determined verification threshold. The disclosed method may further comprise determining the reconstruction error based on reconstruction errors of one or more ground-truth images used to train the auto-encoder.

Disclosed herein are embodiments of a system for improved image procssing and/or character recognition, including an auto-encoder processor, comprising: a plurality of encode layers configured to generate a compressed representation of input image data corresponding to a character classification result, a plurality of decode layers configured to generate a reconstructed image from the compressed representation of the input image data, and a difference calculator configured to determine a reconstruction error between the input image data and the reconstructed image. The auto-encoder processor may be configured to determine whether the character classification result is one of a true positive and a false positive based on the reconstruction error. In some embodiments, each encode layer of the plurality of encode layers comprises a respective neural network comprising a plurality of neurons; and each decode layer of the plurality of decode layers comprises a respective neural network comprising a plurality of neurons. Each neuron of a first encode layer of the plurality of encode layers may comprise a two-dimensional convolutional filter, and each neuron of the encode layers other than the first encode layer may comprise a one-dimensional convolutional filter. The plurality of encode layers may comprise a first encode layer comprising a first number of neurons, and second encode layer comprising a second number of neurons, and a third encode layer comprising a third number of neurons, wherein the first number is larger than the second number and the second number is larger than the third number. The plurality of decode layers may comprise a first decode layer comprising a first number of neurons, and second decode layer comprising a second number of neurons, and a third decode layer comprising a third number of neurons, wherein the third number is larger than the second number and the second number is larger than the first number.

In some embodiments, the auto-encoder processor is configured to invalidate the character classification result in response to determining that the character classification result is a false positive. Invalidating the character classification result comprises one or more of: removing the character classification result from result data, marking the character classification result as a false positive, and recording that the character classification result is a false positive on a non-transitory storage medium. Embodiments of the disclosed system may further include an auto-encoder network configuration engine adapted to train the encode layers and the decode layers to replicate a target character, the target character corresponding to a character of the character classification result.

Disclosed herein are embodiments of a non-transitory computer-readable storage medium comprising instructions configured to cause a computing device to perform operations for improving accuracy of a character recognition system, the operations comprising: receiving a detection result indicating detection of a character at a designated location within a captured image; acquiring input image data corresponding to the designated location within the captured image; configuring an auto-encoder network to replicate a target character corresponding to the character of the detection result; reconstructing an encoding of the input image data by use of a decoder of the auto-encoder network to produce a reconstructed image; calculating a reconstruction error between the input image data and the reconstructed image; and invalidating the detection result in response to the reconstruction error failing to satisfy a determined threshold. In some embodiments, the operations further include encoding the input image data by use of a plurality of encode layers, each encode layer comprising a respective neural network. Each neuron of each encode layer may comprise a convolutional filter, and the convolutional filters of an input encode layer of the plurality of encode layers may comprise two-dimensional convolutional filters.

The decoder may comprise a plurality of decode layers, and each neuron of each decode layer may comprise a one-dimensional convolutional filter. Configuring the auto-encoder network to replicate the target character may comprise generating reconstructed images from plurality of training images by use of the auto-encoder network, each training image comprising a visual representation of the target character; determining reconstruction errors in response to the generating, each reconstruction error comprising a root-mean-square difference between a respective training image and a corresponding reconstructed image;

and learning a configuration of each of a plurality of layers of the auto-encoder network, the learning configured to minimize the determined reconstruction errors.

FIG. 1A is a schematic block diagram of one embodiment of an optical character recognition (OCR) system 100. As disclosed in further detail below, the OCR system 100 may be employed to automatically recognize one or more characters or symbols in an image of an object. The OCR system 100 described herein may be used at any suitable time, such as during a verification sub-process in an industrial manufacturing process.

In the FIG. 1A embodiment, the OCR system 100 includes an image capture device 102, which may comprise any suitable device for capturing image data, including but not limited to: a camera, a scanner, a CCD, and/or the like. The image capture device 102 may be configured to capture images of selected target objects 105. In FIG. 1A, a conveyor 104 carries a plurality of target objects 105 having characters 108 printed or otherwise inscribed thereon (e.g., during a manufacturing process). The target objects 105 may pass in turn within a field of view (FOV) 103 of the image capture device 102. The target objects 105 may be passed through the FOV 103 during an inspection and/or verification process. As such, the image capture device 102 captures images of target objects 105 as such target objects 105 pass through the FOV 103.

In some embodiments, the image capture device 102 may be communicatively coupled to an image processing system 112. The image processing system 112 may comprise a computing device and may include, inter alia, processing resources 206, memory resources 208, non-transitory storage resources 118 (e.g., data storage system (DSS) 229, non-transitory disk drive 218, optical disk drive 222, magnetic disk drive 224), and/or the like. The non-transitory storage resources 118 may comprise one or more storage devices, local storage devices, remote storage devices (e.g., network attached storage devices), and/or the like.

The image processing system 112 receives captured images 115 from the image capture device 102. The image capture device 102 may be coupled to the image processing system 112 using any suitable means, including but not limited to: an interconnect, a bus, a universal serial bus (UBS), a network 114, and/or the like. The network 114 may comprise one or more of a wired network (e.g., Ethernet), a wireless network, and/or the like. Alternatively, or in addition, the image capture device 102 may be connected directly to the image processing system 112 and/or may be integrated into a computing system and/or device comprising the image processing system 112.

The image processing system 112 may be configured to perform one or more OCR operations on the captured images 115 received thereby. The image processing system 112 comprises an OCR engine 122 configured to, inter alia, detect and/or classify characters 108 within a captured image 115. The OCR engine 122 comprises one or more processing units and/or stages 116 configured to implement respective OCR functionality. Each of the units and/or stages 116 may be implemented as separate or combined sub-processes or applications executing on the image processing system 112. In some implementations, fewer or more units 116 may be provided.

The processing units 116 are configured to a) detect characters 108 in the image data and b) classify the characters 108 (as disclosed in further detail herein). In some embodiments, the OCR engine 122 comprises an OCR system as disclosed in U.S. Pat. No. 9,396,404, entitled "Robust Industrial Optical Character Recognition," issued on Jul. 19, 2016. In such embodiments, the processing units 116 include a gradient calculator unit, a feature extractor unit, a correlation unit, a peak detector unit, a combiner unit, and a clean-up unit.

The OCR engine 122 comprises and/or is communicatively coupled to a non-transitory storage resources 118, which may be used to store configuration data 123 pertaining to the OCR engine 122, which may include but is not limited to: OCR classifier data, OCR training data, image data, character models (e.g., histogram of oriented gradients (HOG) models), parameter data, and/or the like. The non-transitory storage resources 118 may be integrated with the image processing system 112 or may be coupled to the image processing system 112 via a suitable connection, such as the network 114.

The OCR engine 122 may be configured to a) receive a captured image 115 and b) generate corresponding OCR data 126. As used herein, OCR data 126 refers to any suitable OCR classification information produced by the OCR engine 122 in response to processing a captured image 115. OCR data 126 may include, but is not limited to: character detections, line detections, word detections, string detections, and/or the like. A "character detection" refers to detection of a particular character 108 within the captured image 115. As used herein, a "character" refers to any unit of information within the captured image 115, including but not limited to: a symbol, a grapheme, a punctuation symbol, a delimiter, a code, an alphabetic character (e.g., Roman characters, Latin characters, Cyrillic characters), an alphanumeric character, and/or the like. A "line detection" refers to detection of a grouping of characters 108 within the captured image 115 (e.g., detection of a line of text). As used herein, a "word detection" refers to detection of a word within the captured image 115. A "word" refers to a group of one or more characters 108. As used herein, a "word" refers to a distinct element of speech or writing, or a unit of information, such as a data element, attribute, name, product code, UPC code, serial number, and/or the like. As used herein, a "string detection" refers to detection of a string within the captured image 115. A "string" refers to a grouping of one or more words (e.g., one or more words within same and/or adjoining lines).

In the FIG. 1A embodiment, characters 108 detected and/or classified in the captured image 115 are represented as respective character classification results 128. As used herein, a character classification and/or detection result (CCR) 128 refers to any suitable data pertaining to detection of a character 108 within a captured image 115. Such information may include, but is not limited to: information pertaining to the detected character 108, such as an identifier of the detected character 108, a label, a human-readable label (e.g., label "A" for detection of the character 'A'), a character code (e.g., a Unicode representation of the character), a location of the detected character 108 within the captured image 115 (e.g., coordinates, height and width, a bounding box, and/or the like), the region of the captured image 115 in which the character 108 was detected (an image patch or crop from the captured image 115), quality metrics, confidence metrics, references and/or links to conflicting CCR 128, and/or the like. As used herein, "conflicting characters" refers to two or more different CCR 128 for the same region (and/or overlapping regions) within the same captured image 115. The OCR engine 122 may output conflicting CCRs 128 when unable to distinguish between two or more different characters in a particular region of the captured image 115 (e.g., due to noise in the input image, insufficient training, characters being visually similar, and/or the like). For example, the OCR system 100 may produce conflicting CCRs 128 classifying a particular region of a noisy captured image 115 as either a "B" or "8." Although particular examples of OCR data 126 and/or CCRs 128 are described herein, the disclosure is not limited in this regard and could be adapted to use, output, and/or interpret any suitable OCR data in any suitable form (e.g., embodied as any suitable data structure). In some embodiments, for example, the OCR data 126 produced for a captured image 115 comprises a collection of CCRs 128, each comprising a tuple comprising one or more of: coordinates of the character 108 detected within the captured image 115, a classification of the detected character 108, and/or the like (e.g., x, y, and C, where x is an x-axis coordinate of the character 108, y is a y-axis coordinate of the character 108, and C is the classification of the character, the character 108 having a predetermined size within the captured image 115).

One or more of the CCRs 128 may be a false positive. As used herein, a "false positive" refers to a CCR 128 made in error (e.g., that does not correspond to a character 108 on the target object 105 and/or captured image 115). By contrast, a "true positive" refers to a correct CCR 128 that accurately detects and/or classifies a character 108 on the target object 105 and/or within the captured image 115. The OCR engine 122 may produce false positives for any number of reasons, including but not limited to: noise in the captured image 115, insufficient training data, confusingly similar characters 108 in the captured image 115, and/or the like.

The OCR system 100 may be configured to reduce errors in OCR data 126 by, inter alia, verifying and/or filtering the CCRs 128 produced by the OCR classification engine 122. The verification and/or filtering may be performed by a separate and/or independent processing unit based on configuration data that is separate and/or independent of the configuration data 123 used to produce the OCR data 126.

The OCR system 100 may further include an OCR verification engine 132 configured to validate and/or filter the OCR data 126 produced by the OCR classification engine 122. The OCR verification engine 132 may be configured to, inter alia, a) remove false positive CCRs 128 and/or b) disambiguate conflicting CCRs 128. The OCR verification engine 132 may validate CCRs 128 independently from the OCR classification engine 122.

The OCR verification engine 132 may validate CCRs 128 using OCR validation data 143 that is separate from and/or independent of the OCR configuration data 123 used by the OCR classification engine 122 to produce the OCR detection results 128. The OCR validation data 143 may be stored within the non-transitory storage resources 118. In some embodiments, the OCR validation data 143 is separate from and/or independent of the OCR configuration data 123 (and/or in a separate data store from the OCR configuration data 123). The OCR verification engine 132 may be configured to validate CCRs 128 by use of an auto-encoder validation (AEV) processor 136. The AEV processor 136 may independently verify each CCR 128 as one of a true positive and false positive. The OCR verification engine 132 may generate verified OCR data 146. CCRs 128 identified as a false positive may be removed from the verified OCR data 146 and/or marked as a false positive within the verified OCR data 146 (e.g., in the CCR 148 of the verified OCR data 146). The verified OCR data 146 may further comprise verified line detection data 646 and/or verified string detection data 648, as disclosed herein.

Figure 2:
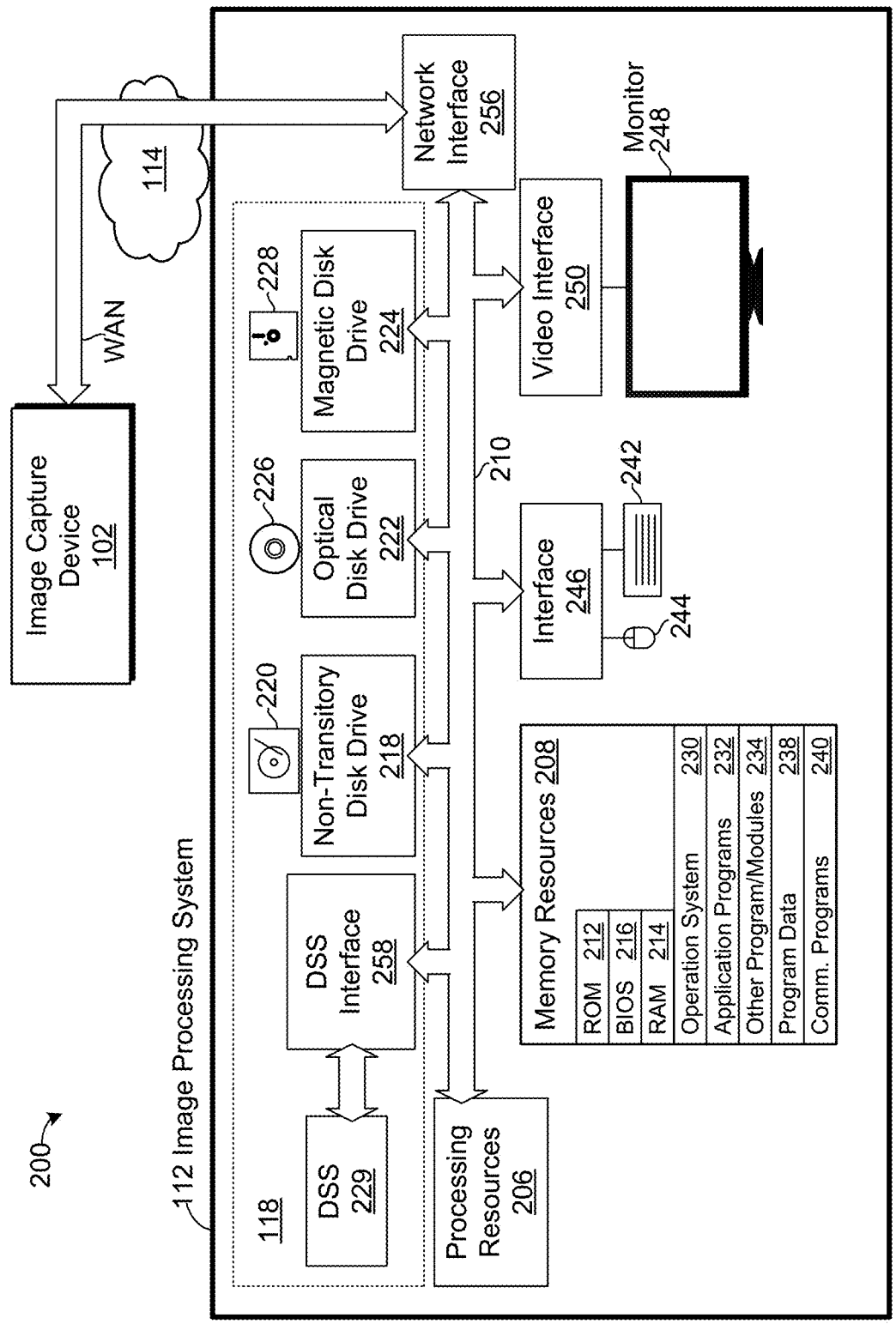
FIG. 2 is a functional block diagram of an image processing system, according to at least one illustrated embodiment.

FIG. 2 and the following discussion provide a brief, general description of components comprising embodiments of the OCR system 100 disclosed herein, including the image processing system 112 and the image capture device 102 in which the various illustrated embodiments can be implemented. The OCR system 100 may, for example, implement the various functions and operations discussed immediately above in reference to FIG. 1A. Although not required, some portion of the embodiments will be described in the general context of computer-executable instructions or logic, such as program application modules, objects, or macros being executed by a computer. Those skilled in the relevant art will appreciate that the illustrated embodiments as well as other embodiments can be practiced with other computer system or processor-based device configurations, including handheld devices (e.g., smart phones, PDAs), multiprocessor systems, microprocessor-based or programmable consumer electronics, personal computers (PCs), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The image processing system 112 may take the form of a conventional PC, server, or other computing system executing logic or other machine executable instructions. The image processing system 112 may comprise processing resources 206, memory resources 208, and a system bus 210 that couples various system components. The image processing system 112 will at times be referred to in the singular herein, but this is not intended to limit the embodiments to a single system, since in certain embodiments, there will be more than one image processing system 112 or other networked computing device involved. Non-limiting examples of commercially available systems include, but are not limited to, an 80×86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing resources 206 may comprise any suitable processing means including, but not limited to: a logic processing unit, a central processing unit (CPUs, a microprocessor, a digital signal processor (DSP), a graphics processor (GPU), an application-specific integrated circuit (ASIC), a field programmable gate array (FPGA), and/or the like. Unless described otherwise, the construction and operation of the various blocks shown in FIG. 2 are of conventional design. As a result, such blocks need not be described in further detail herein, as they will be understood by those skilled in the relevant art.

The system bus 210 can employ any known bus structures or architectures, including a memory bus with memory controller, a peripheral bus, and a local bus. The memory resources 208 may comprise any suitable memory means including, but not limited to: system memory, cache memory, on-board memory, external memory, volatile memory, non-volatile memory, read-only memory (ROM) 212, random access memory (RAM) 214, and/or the like. A basic input/output system (BIOS) 216, which may be incorporated into at least a portion of the ROM 212, contains basic routines that help transfer information between elements within the image processing system 112, such as during start-up. Some embodiments may employ separate buses for data, instructions and power.

The image processing system 112 may further comprise one or more non-transitory storage resources 118, which may include, but are not limited to: a non-transitory disk drive 218, an optical disk drive 222, a magnetic disk drive 224, a DSS 229, and/or the like. The non-transitory disk drive 218 may be configured to persistently store data within and/or retrieve data from a non-transitory storage medium 220, such as a hard disk, solid-state storage medium, Flash storage medium, and/or the like. The non-transitory disk drive 218 may, therefore, comprise one or more of a hard disk drive, solid-state storage device, solid-state drive, solid-state memory device, non-volatile memory device, and/or the like. The optical disk drive 222 may be configured to store and/or retrieve data from an optical storage medium 226. The optical storage medium 226 may comprise a compact disk (CD), digital versatile disk (DVD), and/or the like.

The magnetic disk drive may be configured to store and/or retrieve data from a magnetic storage medium 228. The magnetic storage medium 228 may comprise one or more of a magnetic disk, magnetic floppy disk, and/or the like. The non-transitory disk drive 218, optical disk drive 222 and magnetic disk drive 224 may be operatively coupled to the processing resources 206 via the system bus 210. The non-transitory disk drive 218, optical disk drive 222 and magnetic disk drive 224 may include interfaces or controllers (not shown) coupled between such drives 218, 222, 224 and the system bus 210. The drives 218, 222, 224, and their associated computer-readable media 220, 226, 228, respectively, provide nonvolatile storage of computer-readable instructions, data structures, program modules and other data for the image processing system 112. Those skilled in the relevant art will appreciate that other types of non-transitory, computer-readable media may be employed to store data accessible by a computer, such as magnetic cassettes, flash memory cards, Bernoulli cartridges, RAMs, ROMs, smart cards, etc.

Program modules and/or data may be stored in the memory resources 208 (e.g., within system memory). Such program modules and/or data may include, but are not limited to: an operating system 230, application programs 232, other programs or modules 234, program data 238, and/or the like.

The application program(s) 232 may include logic capable of providing the OCR functionality described herein. For example, application programs 232 may receive captured images 115 from the image capture device 102 or stored within the non-transitory storage resources 118. The memory resources 208 may include communications programs 240 configured to enable the image processing system 112 to access and exchange data with other networked systems or components, such as the image capture device 102 and/or other computing devices.

While shown in FIG. 2 as being stored in the memory resources 208, the operating system 230, application programs 232, other programs/modules 234, program data 238 and communications programs 240 can be stored on the non-transitory storage medium 220 of the non-transitory disk drive 218, the optical disk 226 of the optical disk drive 222 and/or the magnetic disk 228 of the magnetic disk drive 224.

Authorized personnel can enter commands (e.g., system maintenance, upgrades, etc.) and information (e.g., OCR parameters, equations, models, etc.) into the image processing system 112 using one or more communicably coupled input devices such as a touch screen or keyboard 242, a pointing device such as a mouse 244, and/or a push button (not shown). Other input devices can include a microphone, joystick, game pad, tablet, scanner, biometric scanning device, etc. These and other input devices are connected to the processing resources 206 through an interface 246 such as a universal serial bus (USB) interface that couples to the system bus 210, although other interfaces such as a parallel port, a game port or a wireless interface or a serial port may be used. A monitor 248 or other display device is coupled to the system bus 210 via a video interface 250, such as a video adapter. In at least some instances, the input devices may be located proximate the image processing system 112, for example when the system is installed at the system user's premises. In other instances, the input devices may be separate from the image processing system 112, for example when the system is installed on the premises of a service provider.

In some implementations, the image processing system 112 uses one or more of the logical connections to optionally communicate with one or more remote computers, servers and/or other devices via one or more communications channels, for example one or more networks 114. These logical connections may facilitate any known method of permitting computers to communicate, such as through one or more LANs and/or WANs. Such networking environments are well known in wired and wireless enterprise-wide computer networks, intranets, extranets, and the Internet.

In some implementations, a network port or interface 256, communicatively linked to the system bus 210, may be used for establishing and maintaining communications over the communications network 114. Further, a DSS interface 258, which is communicatively linked to the system bus 210, may be used for establishing communications with the DSS 229, which may be a part of the image processing system 112 and/or in operative communication therewith (through the network 114). For example, the DSS 229 may include a repository for storing information regarding OCR parameters, models, image data, etc. In some embodiments, the DSS interface 252 may communicate with the DSS 229 via one or more networks 114.

In the OCR system 100, program modules, application programs, or data, or portions thereof, can be stored in one or more computing systems. Those skilled in the relevant art will recognize that the network connections shown in FIG. 2 are only some examples of ways of establishing communications between computers, and other connections may be used, including wirelessly. In some embodiments, program modules, application programs, or data, or portions thereof, can even be stored in other computer systems or other devices (not shown).

For convenience, the processing resources 206, memory resources 208, network port 256 and interfaces 246, 252 are illustrated as communicatively interconnected via the system bus 210, thereby providing connectivity between the above-described components. In alternative embodiments, the above-described components may be communicatively coupled in a different manner than illustrated in FIG. 2. For example, one or more of the above-described components may be directly coupled to other components, or may be coupled to each other, via intermediary components (not shown). In some embodiments, system bus 210 is omitted and the components are coupled directly to each other using suitable connections.

The image processing system 112 may take the form of one or more server computer systems with associated non-transitory processor-readable storage media. While illustrated as a single computer system and associated nontransitory storage media, many implementations may employ two or more computer systems and/or nontransitory associated processor- or computer-readable storage media. In some implementations or instances, the nontransitory processor- or computer-readable media may include a database or other data structure which stores one or more of: image data, model data, training data, test data, parameter data, character detection or recognition algorithms, and/or other data.

While generally described below in terms of a user interface generated via instructions executing on a computing device, in some implementations the image processing system 112 may serve as a user portal that may operate, for example, as a Web server, serving HTML pages or providing Web services which function as the user interface. Thus, in some implementations, the image processing system 112 serves as a user portal, providing a user interface that allows users to access functionality disclosed herein via various other processor-based computing devices.

While often illustrated as a single nontransitory processor-readable storage medium, in many implementations each of the various illustrated nontransitory computer- or processor-readable storage media may constitute a plurality of nontransitory storage media. The plurality of nontransitory storage media may be commonly located at a common location, or distributed at a variety of remote locations. Database(s) may be stored separately from one another on separate computer- or processor-readable storage media or may be stored on the same computer- or processor-readable storage medium as one another. Various computer- or processor-readable storage media may be co-located with the corresponding computer systems, for example in the same room, building or facility. Alternatively, various computer- or processor-readable storage media may be located remotely from the corresponding computer systems (e.g., server computer systems), for example in a different facility, city, state or country. Electronic or digital information, files or records, or other collections of information may be stored at specific locations in non-transitory computer- or processor-readable media, and thus are logically addressable portions of such media, which may or may not be contiguous.

Referring back to FIG. 1A, the image processing system 112 may be configured to reduce false positives and/or conflicting CCRs 128 in the OCR data 126 by use of a separate, independent OCR verification engine 132. The OCR verification engine 132 comprises an AEV processor 136 to validate respective CCRs 128 using, inter alia, an auto-encoder network (AEN) 144. The AEN 144 comprises a deep learning neural network configured such that the output produced thereby is a replica of the input provided thereto. The AEN 144 may be trained to validate detections and/or classifications of particular characters 108 (the AEN 144 may be configured to validate CCRs 128 corresponding to detection of 'A' characters 108 in the captured image 115). In some embodiments, the AEV processor 136 comprises a plurality of AENs 144, each AEN 144 configured to validate detection of a different respective character 108 (e.g., a first AEN 144 configured to validate CCRs 128 for 'A' characters 108, a second AEN 144 configured to validate CCRs 128 for 'B' characters 108, and so on). Alternatively, the AEV processor 136 may configure one or more AENs 144 to validate CCRs 128 of selected characters 108 by use of respective character validation datasets 142. As used herein, a character validation dataset (CVD) 142 refers to electronically encoded information (computer-readable data and/or instructions) for configuring an AEN 144 (and/or AEV processor 136) to validate detection and/or classification of a specified target character 145. As used herein, a target character 145 may refer to any suitable character 108 (e.g., any character 108 capable of being detected, identified, and/or classified by the OCR engine 122 and/or included in the OCR data 126). A plurality of CVD 142 may be maintained within the non-transitory storage resources 118 of the image processing system 112: a first CVD 142{'A'} may be adapted to configure an AEN 144 to validate detection of 'A' characters 108, a second CVD 142{'B'} may be adapted to configure the AEN 144 to validate CCR 128 pertaining to 'B' characters 108, and so on.

Figure 1B:
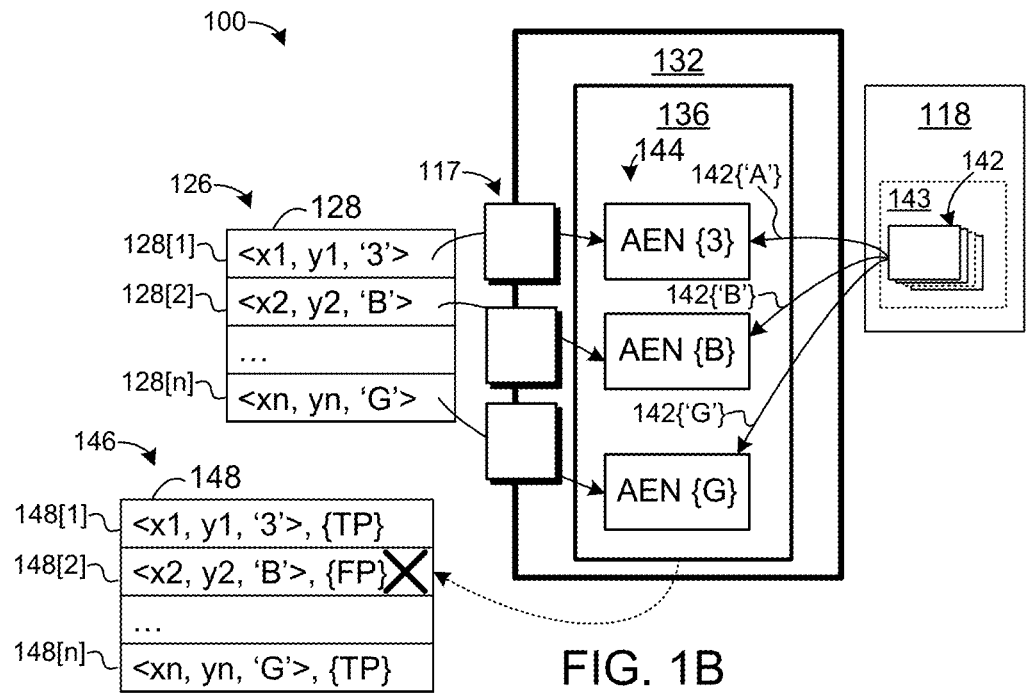
FIG. 1B is a schematic block diagram of an OCR verification engine, according to at least one disclosed embodiment.

FIG. 1B is a schematic block diagram illustrating embodiments of an OCR verification engine 132 of the image processing system 112. The OCR validation engine 132 may receive OCR data 126 comprising a plurality of CCRs 128. In the FIG. 1B embodiment, each CCR 128 comprises a tuple, including: a) coordinates of a character 108 detected within the captured image 115, and b) a label of the detected character 108. The OCR data 126 comprises CCR 128[1] corresponding to detection of a '3' character 108 at coordinates <x1,y1>, CCR 128[2] corresponding to detection of a 'B' character 108 at coordinates <x2,y2>, and so on, to CCR 128[n] corresponding to detection of a character 'G' at coordinates <xn,yn>. The OCR validation engine 132 may be configured to independently verify each of the CCRs 128. As disclosed above, each CCR 128 may be verified by use of a corresponding AEN 144 (e.g., an AEN 144 configured to validate detection and/or classification of the characters 108 corresponding to the respective CCRs 128). As disclosed above, the AEV processor 136 may comprise a plurality of AENs 144, each AEN 144 configured to validate detection and/or classification of a respective target character 145. As used herein, a target character 145 may refer to any suitable character 108 (e.g., any character 108 capable of being detected, identified, and/or classified by the OCR engine 122 and/or included in the OCR data 126). Alternatively, the AEV processor 136 may comprise one or more AENs 144, each AEN 144 configurable to validate detection of selected characters 108 by use of respective CVD 142 (e.g., CVD 142{'3'} for validation of '3' characters 108, CVD 142{'B'} for validation of 'B' characters 108, CVD 142{'G'} for validation of 'G' characters 108, and so on). As illustrated in FIG. 1B, CCR 128[1] is validated by use of an AEN 144 configured for target character '3' (by use of CVD 142{'G'}), CCR 128[2] is validated by use of an AEN 144 configured for target character 'B' (by use of CVD 142{'B'}), and so on, with CCR 128[n] being validated by use of an AEN 144 configured for target character 'G' (by use of CVD 142{'G'}). Validating a CCR 128 using an AEN 144 may comprise providing input image data to the AEN 144, processing the input image data through the AEN 144 to produce output image data, and comparing the input image data to the output image data. The image data 117 corresponding to a CCR 128 may comprise a crop, patch, section, and/or region of the captured image 115 in which the character 108 was detected. The CCRs 128 of the FIG. 1B embodiment may correspond to characters 108 of a particular size within the captured image 115 (e.g., 28 by 28 pixels). Therefore, the image data 117 of the respective CCRs 128 may be determined from the coordinates thereof (e.g., the image data 117 for CCR 128[1] may comprise a 28 by 28 pixel image crop from and/or around coordinates <x1,y1> within the captured image 115).

As disclosed above, AENs 144 are configured to reproduce respective target characters 108. A CCR 128 that is a true positive for a particular character 108 will correspond to image data 117 comprising a visual representation of the particular character 108. Since the AEN 144 used to validate the CCR 128 is configured to reproduce output image data corresponding to the particular character 108, the output image data produced by the AEN 144 in response to a true positive CCR 128 will be the same (and/or similar to) the image data 117 of the CCR 128. By contrast, the image data 117 of a CCR 128 that is a false positive of a particular character 108 will differ from the target character 108 of the AEN 144 and, as such, the output image data produced by the AEN 144 in response to the false positive CCR 128 will have substantial differences as compared to the image data 117 of the CCR 128. In the FIG. 1B embodiment, CCR 128[1] and CCR 128[n] may be validated as true positives, and the CCR 128[2] may be identified as a false positive. The AEV processor 136 may modify the OCR data 126 and/or produce separate verified OCR data 146 in which the CCR 148[2] is removed and/or marked as a false positive in the OCR data 146 (and CCR 148[1] and 148[n] are marked as true positives).

Figure 1C:
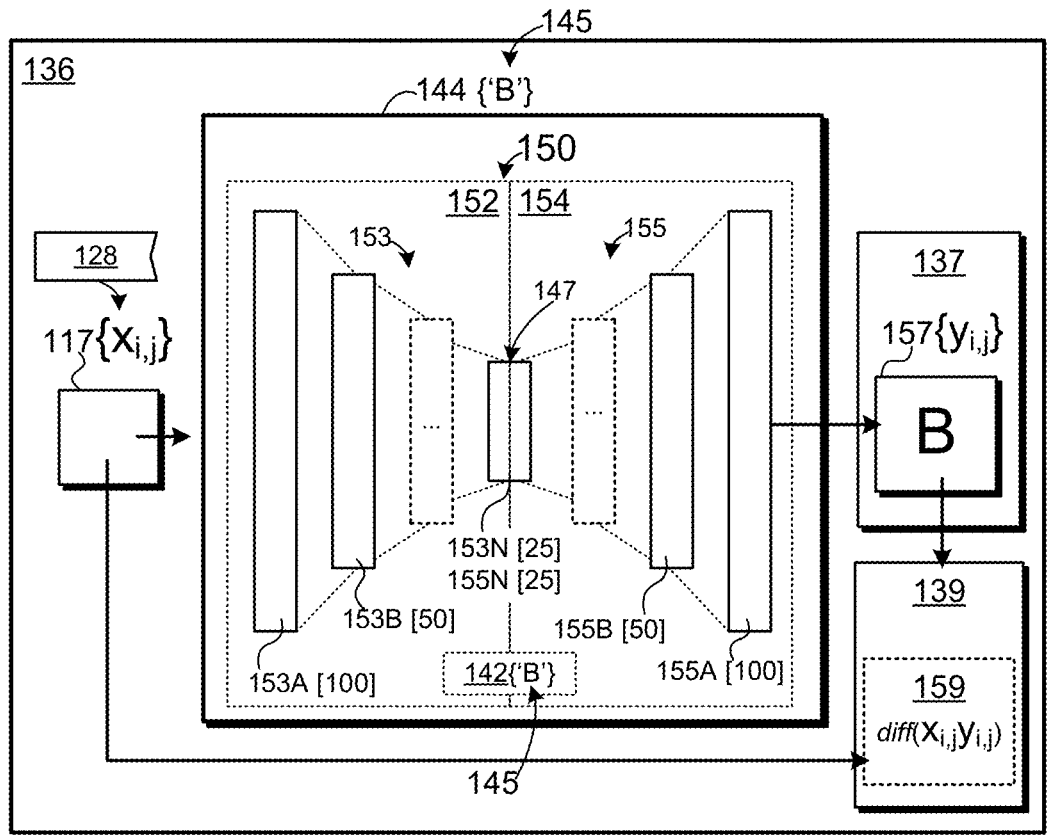
FIG. 1C is a schematic block diagram of an auto-encoder network, according to at least one disclosed embodiment.

FIG. 1C is a schematic block diagram illustrating one embodiment of an AEN 144. The AEN 144 may comprise a plurality of encode/decode layers 150 configured to implement, inter alia, an encoder 152 and decoder 154. The encoder 152 may be configured to transform input image data 117 into an inner layer representation 147. As used herein, an inner layer representation (IRL) 147 of input image data 117 refers to a transformed version of the input image data 117, including, but not limited to, one or more of: a compressed, reduced dimensionality, reduced resolution, scaled, resized, reduced size, and/or other transformation of the input image data 117. The decoder 154 of the AEN 144 is configured to generate a reconstructed image 157 corresponding to the input image data 117 from the IRL 147. The decode layers 155 may be configured to generate the reconstructed image 157, which may comprise a decompressed, expanded dimensionality, increased resolution, scaled, resized, upsized, and/or other transformation of the IRL 147. The AEN 144 may, therefore, be configured to encode the input image data 117 as an IRL 147, and to decode the IRL 147 to produce reconstructed image 157 corresponding to the input image data 117, as disclosed herein.

The AEN 144 may comprise a stacked de-noising autoencoder having a plurality of layers 150. In the FIG. 1C embodiment, the encoder 152 comprises three encode layers 153, including: a first encode layer 153A comprising 100 neurons, a second encode layer 153B comprising 50 neurons, and a last encode layer 153N comprising 25 neurons. The first encode layer 153A may be configured to receive input image data 117 and produce a compressed and/or reduced dimensionality output data therefrom, which may flow to an input of the second encode layer 153B. The second encode layer 153B may produce further compressed and/or reduced dimensionality output data, which may flow to an input of the last encode layer 153N, and so on. The last encode layer 153N may produce the IRL 147 corresponding to the input image data 117.

The decoder 154 may comprise three decode layers 155, including: a first decode layer 155N comprising 25 neurons, a second decode layer 155B comprising 50 neurons, and a last decode layer 155A comprising 100 neurons. In some embodiments, the first decode layer 155N and the last encode layer 153N comprise a same layer 150 (e.g., comprise a same network of 25 neurons). The first decode layer 155N may flow to the second decode layer 155B. The second decode layer 155B may generate an output comprising a decompressed and/or expanded version of the IRL 147 (and/or output of the first decode layer 155N), which may flow to an input of the last decode layer 155N. The last decode layer 155A may produce a decompressed and/or expanded reconstruction of the IRL 147, which may comprise the reconstructed image 157 corresponding to the input image data 117. The reconstructed image 157 may be of the same and/or similar size and/or dimensionality as the input image data 117. The first encode layer 153A may comprise an input layer 150 of the AEN 144, the last decode layer 155A may comprise an output layer 150 of the AEN 144, and other layers 150 of the AEN 144 may comprise hidden layers 150.

In some embodiments, the AEV processor 136 further comprises a reconstruction engine 137, which may be configured to generate the reconstructed image 157 from one or more outputs of the decoder 154 (e.g., outputs of the last decode layer 155A). The reconstruction engine 137 may be configured to manipulate such outputs to generate a reconstructed image 157 having a suitable arrangement, format, encoding, and/or the like (e.g., an arrangement, format, and/or encoding to facilitate comparison with the input image data 117). Alternatively, the output of the decoder 152 and/or last decode layer 155A may comprise the reconstructed image 157, and the reconstruction engine 137 may be omitted.

The AEV processor 136 may further comprise a difference engine 139, which may be configured to calculate a reconstruction error 159 between the input image data 117 and the reconstructed image 159. The reconstruction error 159 may comprise a difference between the input image data 117 and the reconstructed image 159 (e.g., determined by comparing pixels ($x_{i,j}$) of the input image data 117 to corresponding pixels ($y_{i,j}$) of the reconstructed image 159). The reconstruction error 159 may indicate a degree to which the input image data 117 corresponds to a target character 145 the AEN 144 is configured to reconstruct and/or validate. As disclosed in further detail herein, the determination of whether a CCR 128 is a true positive of a particular character 108 may be based on the reconstruction error 159 between an input image data 117 corresponding to the CCR 128 (e.g., the crop, patch, and/or region of the captured image 115 corresponding to the CCR 128) and the reconstructed image 157 generated by an AEN 144 in response to the input image data 117 (the AEN 144 configured to replicate and/or reproduce visual representations of the character 108).

An AEN 144 may be configured to validate detection of designated target characters 145 by use of, inter alia, CVD 142 corresponding to the designated target characters 145. A target character 145 may comprise any suitable character 108, as disclosed herein (e.g., any character 108 capable of being detected in an image by the OCR engine 122). An CVD 142 for a particular target character 145 may comprise configuration information adapted to configure an AEN 144 (and/or AEV processor 136) to validate CCR 128 pertaining to the particular target character 145; the CVD 142 may include weights and/or parameters to configure layers 150 of the AEN 144 to reconstruct and/or replicate visual representations of the particular target character 145. An CVD 142 may comprise any suitable information for configuring an AEN 144 to validate a particular target character 145 (e.g., configure layers 150 of the encoder 152 and/or decoder 155 to produce reconstructed image 157 corresponding to the particular target character 145). In FIG. 1C the label CVD 142{'B'} indicates that the CVD 142{'B'} corresponds to target character 145 'B.' The of FIG. 1C may be referred to as AEN 144{'B'} to indicate that the AEN 144 is configured to implement CVD 142{'B'} (e.g., configured to validate target character 145 'B' in accordance with CVD 142{'B'}). Accordingly, in the FIG. 1C embodiment, the AEV processor 136 may determine whether the CCR 128 is a true positive for character 108 'B' by: a) configuring the AEN 144 to implement CVD 142{'B'}; b) generating reconstructed image 157 from input image data 117 corresponding to the CCR 128 by use of the AEV 144{'B'}, c) determining a reconstruction error 159 between the input image data 117 and the reconstructed image 157, and d) comparing the reconstruction error 159 to one or more thresholds. The AEV processor 136 may determine that the CCR 128 is a true positive of the target character 145 'B' in response to the reconstruction error 159 satisfying a validation threshold (e.g., the reconstruction error 159 being lower than one or more thresholds). The AEV processor 136 may determine that the CCR 128 is a false positive for the target character 145 'B' in response to the reconstruction error 159 failing to satisfy one or more thresholds (e.g., exceeding one or more thresholds).

The CVD 142 for particular target characters 145 may be determined by, inter alia, training the AEN 144 to replicate images of the target characters 145 in response to input image data 117. Training an AEN 144 may comprise tuning respective weights and/or other parameters of the layers 150 (encode layers 153, decode layers 155, and/or the like), such that the reconstructed image 157 produced by the AEN 144 corresponds to the target character 145. Training the AEN 144 may, therefore, comprise configuring the layers 150 of the AEN 144 to produce reconstructed image 157 comprising visual representations of the target character 145 in response to input image data 117. Training an AEN 144 to validate detection and/or classification of a target character 145 may comprise, inter alia: a) initializing the AEN 144, b) presenting the AEN 144 with training data comprising visual representations of the target character 145 (e.g., ground-truth input images comprising visual representations of the target character 145), and c) applying one or more learning algorithm(s) to configure the AEN 144 to produce reconstructed images 157 comprising visual representations and/or reconstructions of the target character 145.

Figure 1D:
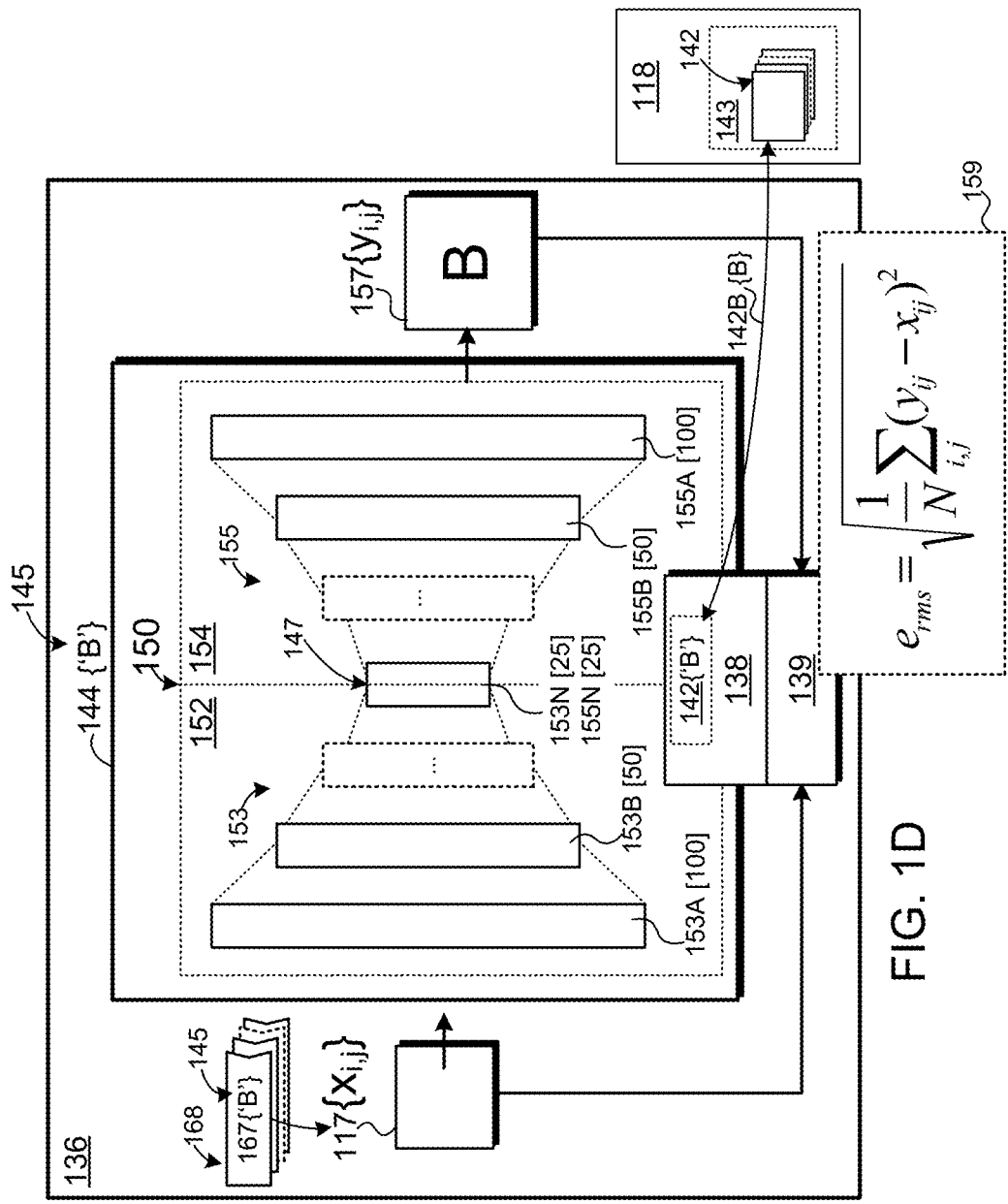
FIG. 1D is a schematic block diagram of another embodiment of an auto-encoder network, according to at least one disclosed embodiment.

FIG. 1D is a schematic block diagram of another embodiment of an AEV processor 136, as disclosed herein. The AEV processor 136 may comprise an encoder 152 and decoder 154 which may be implemented by, inter alia, a plurality of layers 150, as disclosed herein. The AEV network 144 and/or AEV processor 136 may comprise and/or be operatively coupled to a AEN configuration engine 138, which may be configured to manage training and/or configuration of the AEV network 144, as disclosed herein. The AEV configuration engine 138 may be configured to train the AEN 144 to validate a particular target character 145 (e.g., character 'B'). The AEV configuration engine 138 may be configured to: initialize the AEN 144, and utilize training data 168 and one or more learning algorithm(s) to configure the AEN 144 to train the AEN 144 to generate reconstructed images 157 comprising visual representations of the target character 145 in response to image data 117.

The AEN configuration engine 138 may be configured to initialize the AEN 144, which may comprise defining a structure of the AEN 144 and/or instantiating components of the AEN 144 (e.g., initializing and/or instantiating layers 150 of the AEN 144, such as the encode layers 153, decode layers 155, layer-to-layer connections, and/or the like). As disclosed above, the AEN 144 may include a plurality of encode/decode layers 150 comprising respective sets of neurons. The configuration of each layer 150 may be independent, such that the encoding/decoding weights (and/or other configuration parameters) of respective layers 150 may be trained separately. In the FIG. 1D embodiment, the AEV configuration engine 138 may initialize the AEN 144 by instantiating the AEN 144 within the memory resources 208 and/or non-transitory storage resources 118 of the image processing system 112, which may comprise: instantiating the layers 150 comprising the encoder 152 and/or decoder 154 of the AEN 144, instantiating neurons comprising the respective layers 150, coupling the layers 150 to receive respective input data (e.g., receive the input image data 117, outputs from other layers 150, and/or the like), generate output data (e.g., provide output data to one or more other layers 150, reconstruction engine 137, and/or the like), and so on. Instantiating the AEN 144 may, therefore, comprise instantiating and/or initializing each layer 150 of the AEN 150, configuring encode layer 153A to receive input image data 117, configuring encode layer 153B to receive output data generated by encode layer 153A, configuring encode layer 153N to receive output data generated by encode layer 153B (to produce the inner layer representation 147 of the input image data 117), configuring the decode layer 155N to receive the inner layer representation 147 produced by encode layer 153N, configuring decode layer 155B to receive output data generated by decode layer 155N, configuring decode layer 155A to receive output data generated by decode layer 155B to produce reconstructed image 157 therefrom, and so on.

The AEV configuration engine 138 may be further configured to acquire training data 168 corresponding to the target character 145 for use in training the AEN 144. In some embodiments, acquiring the training data 168 comprises selecting CCRs 128 that are true positives for the target character 145 from one or more sets of CCRs 128. The training data 168 may comprise a plurality of training entries 167, each training entry 167 comprising an input image data 117 labeled with the target character 145 (e.g., target character 'B'). In the FIG. 1D embodiment, the input image data 117 of each training entry 167 comprises a visual representation of the target character 145 'B' (and is labeled with the target character 145 'B'). The training data 168 may correspond to a plurality of different captured images 115, captured images 115 corresponding to different objects, captured images 115 corresponding to different industrial applications, and/or the like. One or more of the training entries 167 may comprise CCRs 128 generated by the OCR engine 122 (by processing respective captured images 115), as disclosed herein. Alternatively, or in addition, one or more of the training entries 167 may be produced by another OCR system or device. The training data 168 may be stored on the non-transitory storage resources 118, received via the network 114, and/or the like. In some embodiments, the AEV configuration engine 138 may be further configured to augment the training data 168 with additional, synthetic training entries 167, as disclosed in further detail herein.

The AEV configuration engine 138 may be configured to apply training entries 167 to the AEN 144. Applying a training entry 167 may comprise: a) configuring the AEN 144 to generate a reconstructed image 157 corresponding to the input image data 117 of the training entry 167, b) determining a reconstruction error 159 between the reconstructed image 157 and the input image data 117, and c) set parameters of the AEN 144 in accordance with the determined difference metric 158 (and/or difference metrics 159 corresponding to other training entries 167). In the FIG. 1D embodiment, the reconstruction error 159 may comprise a root-mean-square (RMS) error metric, as disclosed in further detail herein.

In some embodiments, the AEV configuration engine 138 is configured to learn, refine, adjust and/or tune the AEN 144 by use of one or more learning algorithms (and based on the difference metrics 159 corresponding to the training entries 167). The AEV processor 136 may apply the learning algorithm by, inter alia, tuning weight parameters of the encode layers 153A-N and/or decode layers 155A-N to configure the AEN 144 to produce accurate reconstructions of the target character 145 in response to the training data 168 (e.g., in response to input image data 117 comprising the target character 145). As used herein, an "accurate reconstruction" of the target character 145 refers to the AEN 144 producing reconstructed image 157 that accurately reconstructs a visual depiction of the target character 145. An accurate reconstruction may, therefore, refer to reconstructed image 157 that is the same and/or similar to ground-truth image data labeled with the target character 145 (training entries 167), such that difference metrics 159 between the ground-truth image data and corresponding reconstructed image 157 produced by the AEN 144 is relatively low (e.g., less than a threshold). Applying the learning algorithm to train the AEN 144 may comprise tuning weights of the encode layers 153A-N to encode ground-truth image data as respective IRL 147, and tuning weights of the decode layers 155A-N to decode the IRL 147, such that the resulting reconstructed image 157 comprises an accurate visual representation of the target character 145 (such that the reconstructed image 157 is the same or similar to training entries 167).

Training the AEN 144 to accurately reconstruct a target character 145 may require large amounts of training data 168. However, only limited amounts of training data 168 may be available. Therefore, as disclosed above, the AEN processor 136 may be configured to augment the training data 168 with additional, synthetic training entries 167. The AEV processor 136 may be configured to derive additional, synthetic training entries 167 from existing training entries 167 by, inter alia, applying one or more transformations to the input image data 117 of the existing training entries 167. The transformations may include any suitable transformation pertaining to any suitable image characteristic, including, but not limited to: shift transforms, perspective transforms, noise transforms (introducing noise into one or more sets of input image data 117), rotation transforms, scale transforms, brightness transforms, contrast transforms, saturation transforms, and/or the like. The AEN configuration manager 138 may be configured to train the AEN 144 using the additional, synthetic training entries 167, as disclosed herein.

Training the AEN 144 may comprise implementing a plurality of training iterations (epochs), each of which may comprise using the processing resources 206 to process respective training entries 167 of the training data 168 to produce reconstructed images 157 corresponding to the image data 117 of the training entries 167; d) determining difference metrics 159 between the input image data 117 and the reconstructed images 157, and c) turning layers 150 of the AEN 144 to reduce the difference metrics 159 (e.g., reduce differences between the reconstructed image 157 and the target character 145, such the AEN 144 is trained to accurately reconstruct visual representations of the target character 145 in response to input image data 117). As disclosed above, providing the training data 168 to the AEN 144 may comprise introducing noise into one or more sets of input image data 117. In some embodiments, providing the training input image data 117 comprises corrupting one or more ground-truth image(s) with a Gaussian noise having a σ of about 0.1.

In some embodiments, the AEV processor 136 processes the training data 168 in batches comprising about 128 samples (e.g., 128 training entries comprising corrupted input image data 117). Implementing a training "epoch" may comprise: a) processing one or more batches of corrupted training entries 167 through the AEN 144, b) measuring difference metrics 159 for the reconstructed images 157 generated in response to the corrupted training entries 167, and c) tuning the layers 150 of the AEN 144 to minimize the measured difference metrics 159. Measuring the difference metrics of the AEN 144 may comprise providing uncorrupted ground-truth images (uncorrupted training entries 167) to the AEN 144, using the AEN 144 to generate corresponding reconstructed image 157, and determining corresponding difference metrics 159 (and/or comparing the difference metrics 159 for the uncorrupted ground-truth images to difference metrics 159 for the corrupted ground-truth images). Minimizing the difference metrics 159 may comprise applying a gradient descent algorithm to weight parameters of the layers 150. The gradient descent algorithm may comprise the Adam algorithm for gradient optimization having a learning rate set to about 0.01. Training the AEN 144 may comprise implementing a pre-training phase in which each layer 150 of the AEN 144 is pre-trained over about 150 epochs followed by a fine-tuning phase in which encoding/decoding of the layers 150 are further optimized over about another 150 epochs. As disclosed in further detail herein, the difference metrics may be used to determine an error threshold for use in validating CCRs 128.

As disclosed above, training the AEN 144 to validate a particular target character 145 (e.g., 'B' characters) comprises tuning the encoding/decode layers 150 of the AEN 144 to accurately encode/decode (compress/reconstruct) visual representations of the target character 145, such that reconstructed images 157 generated thereby comprise visual representations of the target character 145. The configuration of the trained AEN 144, including the weight parameters of the encoding/decode layers 153/155 thereof, may comprise an CVD 142, which may be used to configure the AEN 144 and/or AEV processor 136 to validate the target character 145 thereof, as disclosed herein. An CVD 142 may comprise any suitable information for configuring an AEN 144 and/or AEV processor 136 to verify and/or validate CCR 128 of particular characters 108. The CVD 142 corresponding to respective target characters 145 (and corresponding training data 168, validation thresholds, and/or the like) may be maintained within the non-transitory storage resources 118 of the image processing system 112. As illustrated in FIG. 1D, The CVD 142 corresponding to target character 145 'B' may be labeled as CVD 142{'B'}. The AEV configuration engine 138 may be configured to store CVD 142{'B'} in the non-transitory storage resources 118 in response to training the AEN 144 to validate target character 145 'B' as disclosed herein (and/or in response to refining existing CVD 142{'B'}). The CVD 142 for respective target characters 145 may be maintained within the non-transitory storage resources 118, and may be updated, refined, and/or adjusted as additional training data 168 are acquired.

As disclosed herein, training the AEN 144 to validate detections of a particular character 108 (target character 145) may comprise the steps of: a) initializing the AEN 144, b) training the initialized AEN 144, and c) applying a learning algorithm to tune the encoding and/or decode layers 153/155 of the AEN 144 to accurately reconstruct the particular character 108 during such training.

The step of initializing the AEN 144 may comprise defining a network structure of the AEN 144. As disclosed above, the network structure of the AEN 144 may comprise three encoding/decode layers 153/155 of 100, 50, and 25 neurons, respectively. Weights at each layer 150 may be initialized to respective default and/or initial values.

The step of training the initialized AEN 144 may comprise feeding sample image data 117 comprising visual representations of the particular character 108 through the AEN 144 during respective training periods (epochs). During each epoch, sample image data 117 is fed through the AEN 144. The sample image data 117 may be corrupted with a Gaussian noise with σ of about 0.1. The corrupted sample image data 117 may be processed by the AEN 144 in batches of 128 samples.

The step of applying a learning algorithm to tune the encoding and/or decode layers 153/155 of the AEN 144 may comprise tuning and/or learning layer parameters by use of a gradient descent algorithm. The gradient descent algorithm may comprise an Adam optimization having a learning rate set to about 0.01.

The process of training the AEN 144 may comprise acquiring training data (e.g., sample image data 117). The sample training data may comprise 312 training examples labeled from 26 captured images 115 (12 samples each). Acquiring training data for the AEN 144 may further comprise generating synthetic training data, as disclosed herein. In some embodiments, each ground-truth sample (sample image data 117) may be used to generate about 1000 synthetic sets of sample image data 117. Generating the synthetic sets of sample image data 117 may comprise applying one or more of: random rotation transformations (e.g., ±10 degrees), scale transformations (e.g., resample by 0.75 to 1.25), and/or the like to a ground-truth sample.

Training an AEN 144 may further comprise performing layer-by-layer pre-training, followed by fine-tuning of the entire network of the AEN 144 to optimize the whole encoding/decoding. Each layer 150 may be pre-trained for 150 epochs, and the fine-tuning phase may comprise another 150 training epochs. At the end of each epoch, the average reconstruction error 159 (e.g., RMS error) with respect to the original, uncorrupted training samples may be calculated. The reconstruction error 159 may be minimized using the Adam algorithm for gradient optimization (e.g., by tuning respective weights of the layers 150). After the training, a configuration of the AEN 144, including the weights, parameters, and/or configurations of the respective layers 150, may be stored within the non-transitory storage resources 118 (as a CVD 142). The CVD 142 may further comprise a final average reconstruction cost for the AEN 144, which may comprise an average RMS error between training entries 167 of the training data 168 and corresponding reconstructed image 157 produced by the trained AEN 144.

Training the AEN 144 may further comprise verifying the AEN 144. Since typical applications have to deal with high variability of samples, not all the possible distortions, variability and corruptions of the samples could be taken in account during the dataset synthesis: a correct, unseen sample is likely to result in a higher reconstruction error 159 with respect to the average one observed during training. Training the AEN 144 may, therefore, comprise determining a threshold ($t_i$) configured to be higher than the RMS error ($e_{rms}$) of image data 117 corresponding to true positives, and lower than the RMS error ($e_{rms}$) for image data 117 corresponding to false positives (referred to as $e_{th}$ above). The i refers to the threshold for the i-th AEN 144, such that each AEN 144 may comprise a different respective threshold ($t_i$) adapted to the particular characteristics thereof. Such training steps may comprise applying validation image data 117 to the AEN 144. The validation image data 117 may correspond to the target character 108 of the AEN 144 (e.g., be labeled with the ground truth thereof). The validation image data 117 may not have been used in training the AEN 144. The reconstruction cost of the validation image data 117 are calculated as disclosed herein (as respective RMS errors ($e_{rms}$)). The reconstruction costs associated with the validation image data 117 may be used to determine the threshold ($t_i$) for the AEN 144. As disclosed above, the threshold ($t_i$) may correspond to the particular AEN 144, such that an AEN 144 and/or CVD 142 corresponding to each target character 145 corresponds to a respective threshold ($t_i$) determined for the target character 145. In some embodiments, the reconstruction costs of the validation image data 117 are modeled with a Gaussian distribution having a mean or expectation μ and a standard deviation σ. The threshold ($t_i$) for the AEN 144 may be calculated as $t_i=\mu+3\sigma$.

Although the threshold ($t_i$) may provide a good approximation of RMS threshold, it is based on the variation of the training and/or validation data. The threshold ($t_i$) may be improved by ensuring that all possible variations of true positives are covered in the training and/or validation data and/or by tuning the threshold ($t_i$) through empirical testing and experience.

As disclosed above, the CVD 142 for particular target characters 145 may comprise information for configuring an AEN 144 (and/or AEV processor 136) to validate CCR 128 corresponding to the particular target characters 145. In the FIG. 1D embodiment, the CVD 142{'B'} may be adapted to configure the AEV processor 136 (and/or AEN 144) to validate CCR 128 corresponding to target character 145 'B.' The AEN 144 may be trained to reconstruct and/or validate other target characters 145 (using training data 168 pertaining to the other target characters 145), and the corresponding CVD 142 for such other target characters 145 may be recorded within the non-transitory storage resources 118 for subsequent use by the AEV processor 136 (and/or other AEV processors 136) to validate CCR 128 pertaining to such other target characters 145 (e.g., within respective AEV configuration datasets 142{'A'}, 142{'C'}, and so on), As disclosed herein, using an AEN 144 to validate a CCR 128 may comprise, inter alia, configuring the AEN 144 to implement a selected CVD 142, which may be selected based on the character 108 of the CCR 128 (e.g., such that the character 108 of the CCR 128 corresponds to the target character 145 of the CVD 142). By way of non-limiting example, the AEV processor 136 may configure the AEN 144 to implement CVD 142{'B'} in response to receiving a CCR 128 pertaining to character 108 'B' for validation. Validating the CCR 128 may further comprise: configuring the AEN 144 to implement the selected CVD 142 (e.g., configuring the AEN 144{'B'} to implement the weights and/or parameters defined in CVD 142{'B'}); generating reconstructed image 157 corresponding to input image data 117 of the CCR 128 (by encoding/decoding the image data 117 by the AEN 144{'B' }); determining difference metrics 159 between the input image data 117 and the reconstructed image 157; and comparing the determined difference metrics 159 to one or more thresholds.

As disclosed above, if the CCR 128 is a true positive for the character 108 that the AEN 144 is configured to reconstruct, the image data 117 of the CCR 128 will be highly similar to the reconstructed image 157 output by the AEN 144 (resulting in a low reconstruction error 159). By contrast, the image data 117 of a CCR 128 that is a false positive will differ from the reconstructed image 157 produced by the AEN 144 (since the AEN 144 is configured to reconstruct a visual representation of a character 108 different from the character 108 (if any) represented in the image data 117).

In some embodiments, the reconstruction error 159 corresponds to a pixel-by-pixel comparison between the image data 117 and the reconstructed image 157. The image data 117 may comprise an array of pixels (pixels $x_{i,j}$, where i comprises a range along the x-axis of the captured image 115 and j comprises a range along the y-axis of the captured image 115). The reconstructed image 157 may comprise a corresponding array of pixels $y_{i,j}$. The reconstruction error 159 may correspond to pixel-by-pixel comparisons between pixels $x_{i,j}$ of the image data 117 and corresponding pixels $y_{i,j}$ of the reconstructed image 157. In some embodiments, the reconstruction error 159 comprises an RMS error, calculated as follows:

$$e_{rms} = \sqrt{\frac{1}{N} \sum_{i,j} (y_{i,j} - x_{i,j})^2} . \qquad \text{Eq. 1}$$

In Eq. 1, $e_{rms}$ is the RMS error between the image data 117 and the reconstructed image 157 (the reconstruction error 159), N is the number of pixels in the image data 117 (and reconstructed image 157, respectively), $x_{i,j}$ are pixels of the image data 117, and $y_{i,j}$ are corresponding pixels of the reconstructed image 157.

The AEV processor 136 may determine whether a CCR 128 is a false positive of detection of a particular character 108 based on the reconstruction error 159. If the reconstruction error 159 is greater than a threshold (indicating that the image data 117 of the CCR 128 is significantly different from the reconstructed image 157 produced by the AEN 144 trained to reconstruct the particular character 108) and, as such, the CCR 128 fails verification and is determined to be a false positive. By contrast, if the reconstruction error 159 is smaller than the threshold (indicating that the image data 117 is similar to the reconstructed image 157), the CCR 128 is verified as a true positive for detection of the particular character 108. The AEV processor 136 may detect false positives as follows:

$$\text{False positive if: } e_{th} < e_{rms} \text{ or } \sqrt{\frac{1}{N} \sum_{i,j} (y_{i,j} - x_{i,j})^2} . \qquad \text{Eq. 2}$$

In Eq. 2, a CCR 128 is identified as a false positive in response to the RMS error ($e_{rms}$) between the image data 117 of the CCR 128 for a detected character 108 and the reconstructed image 157 generated by the AEN 144 configured to validate the detected character 108 exceeds an RMS error threshold ($e_{th}$). The value of the RMS error threshold ($e_{th}$) may be set in accordance with testing and experience. Alternatively, or in addition, the RMS error threshold ($e_{th}$) may correspond to RMS errors determined while training the AEN 144 (e.g., while developing and/or refining the CVD 142 for the target character 145). The RMS error threshold ($e_{th}$) may correspond to RMS error(s) determined for test entries 167 of the training data 168 during training. The RMS error threshold ($e_{th}$) may comprise one or more of a maximum RMS error of the training entries 167, an average RMS error of the training entries 167 (plus an offset), a maximum RMS error for noisy and/or corrupting training entries 167, an average (and/or adjusted average) RMS error for the noisy and/or corrupting training entries 167, a minimum RMS error for false positive training entries 167, and/or the like. The RMS threshold ($e_{th}$) determined for a particular target character 145 may, therefore, correspond to difference metrics 159 determined while developing the CVD 142 for the particular target character 145 and, as such, may differ between different target characters 145. The RMS threshold ($e_{th}$) for respective target characters 145 may, therefore, be included in the CVD 142 for the respective target characters 145 (maintained on the non-transitory storage resources 118).

Figure 3:
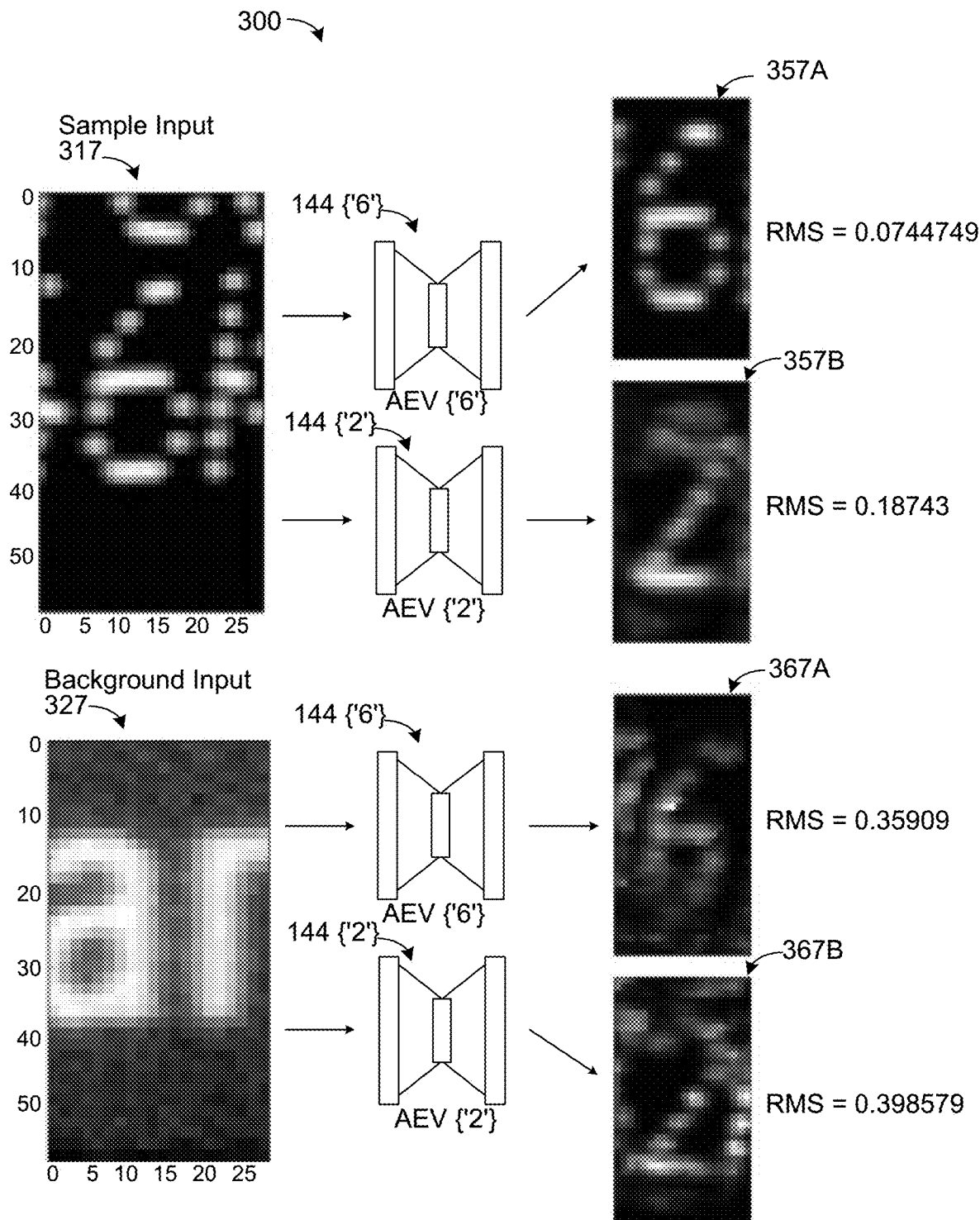
FIG. 3 illustrates exemplary input image data and corresponding auto-encoder reconstruction data.

FIG. 3 shows exemplary image data 317 and 327. In FIG. 3, image data 317 and 327 are input to AEN 144, including an AEN 144 {'6'} configured to implement an CVD {'6'} determined for target character 145 '6' and an AEN 144 {'2'} configured to implement an CVD 142{'2'} determined for target character 145 '2.' As illustrated in FIG. 3, the image data 317 comprises a visual representation of character '6.' The AEN 144 {'6'} is configured to reconstruct visual representations of character '6.' As such, the image data 317 is highly similar to the corresponding reconstructed image 357A output by AEN 144 {'6'} (and results in a low RMS error of 0.0744749). By contrast, since the AEN 144 {'2'} is trained to reconstruct character '2,' the image data 317 is dissimilar to the corresponding reconstructed image 357B output thereby (and results in a higher RMS error of 0.18743). Based on these results, the AEN 144 {'6'} may validate a CCR 128 corresponding to image data 317 as a true positive for detection of character '6' and a false positive for detection of character '2.' Image data 327 comprises background image data (neither character '6' or '2'). As such, the image data 327 is significantly different from the reconstructed image 367A and 367B produced by AEN 144 {'6'} and AEN 144 {'2'} (having RMS errors of 0.35909 and 0.398578, respectively). Based on these results, both AEN 144 {'6'} and 144 {'2'} would identify image data 327 as a false positive of character '6' and/or '2.'

As disclosed above, the difference metrics 159 used to distinguish false positives from true positives may be based on pixel-by-pixel comparisons between the image data 117 and corresponding reconstructed image 157. As such, the relative position of characters 108 within the image data 117 and/or reconstructed image 157 (and/or training data used to develop corresponding CVD 142) may affect the resulting difference metrics 159. In some embodiments, characteristics of the captured image 115 may differ from characteristics of the image data used to train and/or validate the AEN 144. Accordingly, characteristics of the image data 117 associated with the CCRs 128 generated by the OCR engine 122 may differ from the reconstructed image 157 produced by the AEN 144. For example, the position, orientation, and/or scale of characters 108 in the image data 117 may differ from the position(s), orientation(s), and/or scale(s) of the characters 108 in the image data used to train and/or validate the AEN 144 (e.g., develop CVD 142 corresponding to the characters 108). These differences may result in higher difference metrics 159, which could result in improperly rejecting some CCRs 128 as false positives. In some embodiments, the AEV processor 136 is configured to address these issues by, inter alia, a) producing additional training and/or validation data for the AEN 144 (e.g., by producing synthetic training and/or validation data, as disclosed in further detail herein), and/or b) manipulating the image data 117 used to validate the validating CCRs 128, which may comprise expanding the sample area within the captured image 115.

In some embodiments, the AEV processor 136 validates CCRs 128 by, inter alia, providing a plurality of different sets of image data to the AEN 144, each set of image data corresponding to a respective crop, patch, section, region, orientation, and/or transformation of the captured image 115. Each set of image data may correspond to a respective position, offset, orientation, and/or scaling within the surrounding area of the CCR 128. The "surrounding area" of the CCR 128 may comprise a fraction of the height and/or width of the training and/or validation images used to train the AEN 144, such that each set of image data comprises a same size crop of the captured image 115 at a respective offset, position, scaling, and/or transform from the coordinates of the CCR 128. Each set of image data may be processed by the AEN 144 to produce respective reconstructed image 157 (as if sliding the AEN 144 over the captured image 115). The AEV processor 136 may compare the sets of image data to corresponding reconstructed image 157 to determine whether the CCR 128 is a false positive. In some embodiments, the AEV processor 136 uses the smallest reconstruction error 159 to determine whether the CCR 128 is a false positive. Alternatively, the AEV processor 136 may combine and/or aggregate difference metrics 159 for each set of image data (e.g., determine an average reconstruction error 159, a median reconstruction error 159, and/or the like).

Figure 4A:
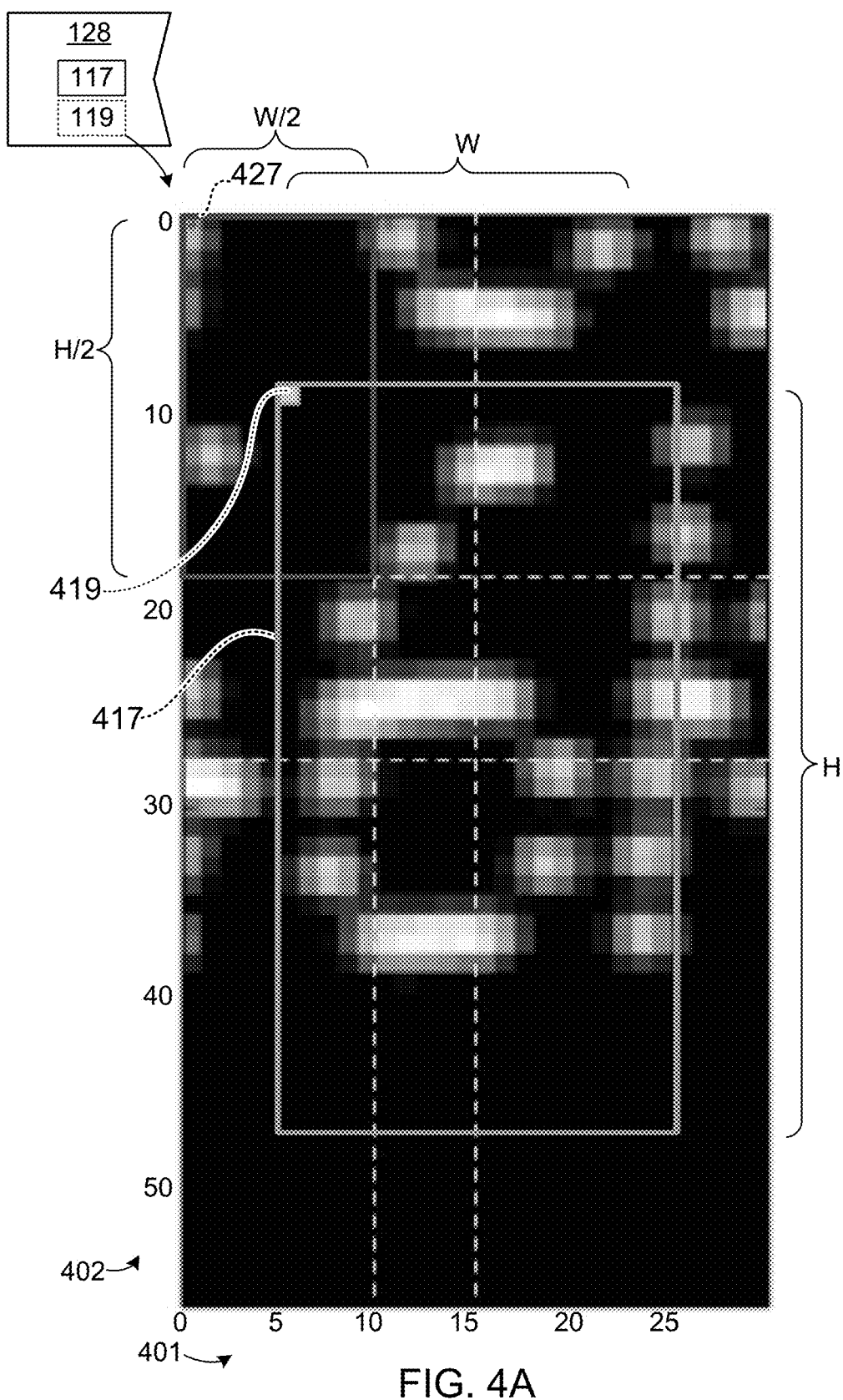
FIG. 4A illustrates exemplary embodiments for expansion of image data corresponding to a character detection.

FIG. 4A depicts one embodiment of image data 117 corresponding to a character result 128. In the FIG. 4A embodiment, the CCR 128 corresponds to detection of '6' at <15,28> within a captured image 115 where 15 is a pixel position along the x-axis 401 of the captured image 115, and 28 is a pixel position along the y-axis 402 of the captured image 115). The AEV processor 136 may be configured to validate the CCR 128, as disclosed herein (e.g., using an AEN 144 configured to validate detections of '6' characters 108). The AEN 144 may be configured to process image data having particular dimensions, in accordance with the image (s) used to train and/or validate the AEN 144. The image data 417 corresponding to the CCR 128 may comprise a W×H crop at <15,28> within the captured image 115 (the pixel in the top left corner of the image data 417 is labeled 419 in FIG. 4A). The AEV processor 136 may be configured to validate the CCR 128 by, inter alia, processing a plurality of separate image data sets, including image data 417, and/or one or more other sets of image data. The image data 417 may comprise and/or correspond to the region of the captured image 115 used by the OCR engine 122 to produce the CCR 128. In the FIG. 4A embodiment, the image data 417 comprises a W×H crop of the captured image 115 at coordinates <15,28>. Other sets of image data may be produced by shifting the crop within the captured image 115 (e.g., by "sliding" the W×H bounds of the image data 117 within the captured image 115). The other sets of image data may correspond to region 427. The size of the region 427 may correspond to the size of the images used to train and/or validate the AEN 144. The region 427 may have a width of W/2 and a height of H/2 (where W and H are the width and height of the training and/or images, respectively). The region 427 may define an enlarged sample area 119 within the captured image 115. As illustrated in FIG. 4A, producing the other sets of image data may comprise sliding the pixel 419 in the top left corner of the image data 417 within the enlarged sample area 119 corresponding to the region 427 (across W/2 and H/2, respectively). Each different position of the pixel 419 in region 427 may correspond to a different respective set of image data 117 within the enlarged sample area 119. The number of different sets of image data 417A-N may be expressed as:

$$C = \lfloor H * W * f \rfloor \qquad \text{Eq. 3}$$

In Eq. 3, C is the number of sets of image data and f is the relationship between image size and the expansion region 427 (e.g., ½ W and/or H in FIG. 4A). The value of f may be set in accordance with testing and experience. As disclosed above, the different sets of image data may be produced to avoid incorrect false positives due to, inter alia, different character position, offsets, and/or scale. Therefore, if f is too small, there are fewer chances to align the image data with the reconstructed image 157, which could cause some CCRs 128 to be improperly identified as false positives. If f is too large, however, the computational overhead for validating CCRs 128 can become impractical (since larger values off result in larger numbers of image data sets to be evaluated by the AEV processor 136).

Figure 4B:
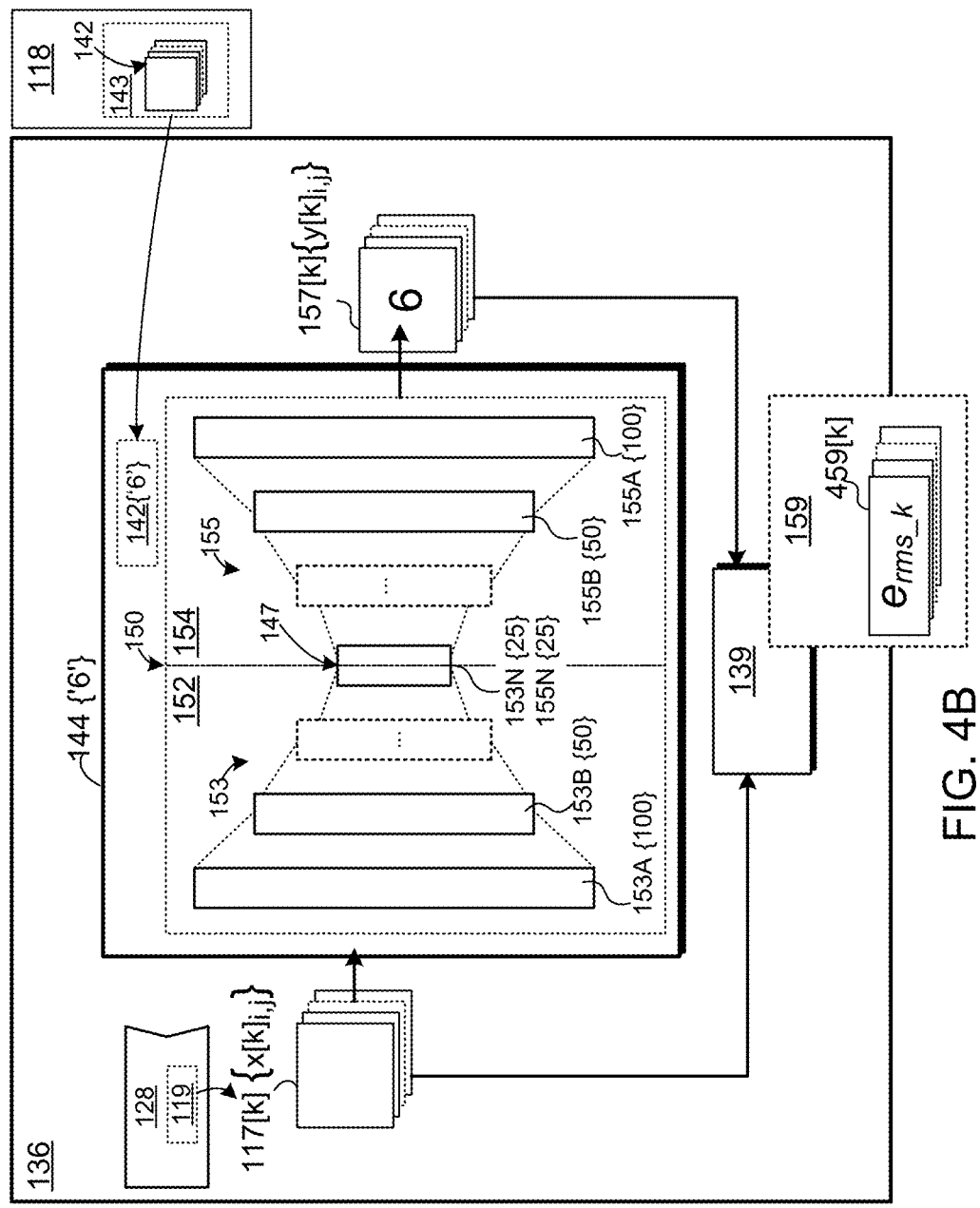
FIG. 4B is a schematic block diagram of an auto-encoder verification processor, according to at least one illustrated embodiment.

FIG. 4B is a schematic block diagram illustrating another embodiment of an AEV processor 136, as disclosed herein. In the FIG. 4B embodiment, the CCR 128 comprises detection of character '6' at particular coordinates within a captured image 115 (e.g., coordinates <15,28>). The AEV processor 136 may validate the CCR 128 by use of an AEN 144. The AEN 144 may be configured for target character 145 '6' (by use of CVD 142 {'6'} retrieved from the non-volatile storage resources 118 of the image processing system 112) and, as such, is labeled as AEN 144 {'6'} in FIG. 4B.

The AEV processor 136 may validate the CCR 128 by: a) generating a plurality a different sets of image data 117[k], which may comprise producing a plurality of different crops of the captured image 115, as disclosed herein (e.g., shifting a W×H window at <15,28> within the captured image 115 by W/2 and H/2, respectively). Each set of image data 117[k] may comprise a respective array of pixels $x[k]_{i,j}$. The AEV processor 136 may use the AEN 144 {'6'} to generate a plurality of reconstructed images 157[k] corresponding to each set of image data 117[k] (e.g., by feeding respective sets of image data 117[k] through the AEN 144 {'6'} such that the layers 150 of the AEN 144 {'6'} encode/decode such data to produce reconstructed image 157[k], as disclosed herein. Each set of reconstructed image 157[k] comprises a respective array of pixels $y[k]_{i,j}$. The AEV processor 136 may be further configured to calculate respective RMS errors ($e_{rms\_k}$) 459, each corresponding to an RMS error between a respective set of image data 117[k] and corresponding reconstructed image 157[k]. The AEV processor 136 may select the minimum of the k RMS errors ($e_{rms\_min}$), which may be used to determine whether the CCR 128 is a false positive of character '6.' The CCR 128 is marked as a false positive if the smallest of the k RMS errors ($e_{rms\_min}$) is larger than the RMS error threshold ($e_{th}$) for the AEN 144 {'6'}, as illustrated below:

$$e_{th} < e_{rms\_min} = \min_k \left[ e_{rms\_k} = \sqrt{\frac{1}{N} \sum_{i,j} (y[k]_{i,j} - x[k]_{i,j})^2} \right]. \qquad \text{Eq. 4}$$

As disclosed above, processing k different sets of image data 117[k] to validate a CCR 128 may be computationally expensive. In some embodiments, the AEV processor 136 is configured to perform AEV reconstruction over the widened area within the captured image 115 instead of performing k individual reconstructions (e.g., instead of producing k sets of image data 117[k] and generating k sets of corresponding reconstructed image 157[k] as in the FIG. 4B embodiment). The AEV processor 136 may be configured to convert the fully-connected layer-by-layer encoding/decoding operation of the AEN 144 in a two-dimensional convolution at each layer, using the neurons in the first layer of the AEN 144

(encode layer 153A) as convolutional kernels applied to the larger set of image data 117. In this way, the different sets of image data 117[k] are transformed into a three-dimensional object, which consists of the two-dimensional output matrix of the convolution performed through at each layer 150 of the AEN 144 (using the neurons in the first encode layer 153A as convolutional kernels applied to the enlarged sample area 119). The AEN 144 may, therefore, produce a three-dimensional reconstruction 557 comprising the two-dimensional output matrix of the convolution performed through all of the layers 150 of the AEN 144 and, at each location therein, the one-dimensional reconstruction of the input. At each layer 150, the convolution output volume may be predicted in accordance with the following equations:

$$\text{input } W_1 \times H_1 \times D_1 \quad \text{Eq. 5}$$
$$\text{output } W_2 \times H_2 \times D_2$$
$$W_2 = \frac{(W_1 - F_W)}{S + 1},$$
$$H_2 = \frac{(H_1 - F_H)}{S + 1},$$
$$D_2 = K.$$

In Eq. 5, $W_1 \times H_1 \times D_1$ is the input/output volume (width, height, depth), K is the number of filters (e.g., number of neurons within respective encoding/decode layers 153/155, such as 100, 50, and 25 in the exemplary embodiments disclosed herein), S is the convolution stride (e.g., S=1), $F_W$ is the filter width, and $F_H$ is the filter height.

Figure 5:
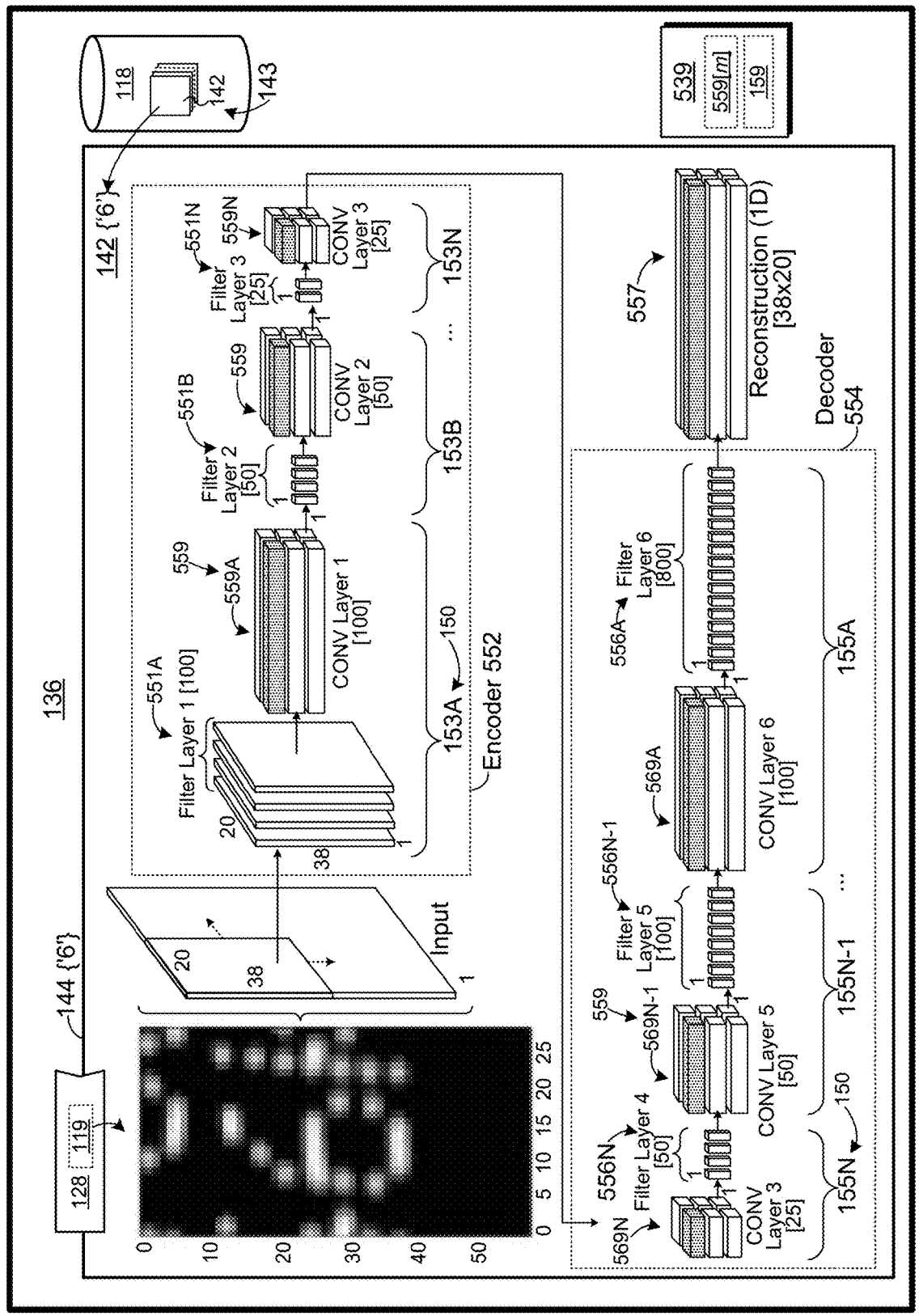
FIG. 5 is a high-level schematic diagram of an auto-encoder verification processor, according to at least one illustrated embodiment.

FIG. 5 is a high-level schematic diagram of an AEV processor 136 comprising an AEN 144 configured to implement encoding and/or decoding over an enlarged sample area 119 within a captured image 155 in a single pass through a fully connected convolutional. The AEN 144 may of the FIG. 5 embodiment may be configured to convert the fully-connected layer-by-layer encoding/decoding operations disclosed above to a two-dimensional convolution at each of a plurality of layers 150 (convolutional filters 551/556), using the neurons in the first layer 551A as convolutional kernels applied to the larger input (enlarged sample area 119 in the captured image 115). The AEV processor 136 may be configured to generate a three-dimensional object comprising the two-dimensional output matrix of the convolution performed through the plurality of layers 150 and, at each location, the one-dimensional reconstruction of the input, as disclosed above. At each layer 150, the convolution output volume may be predicted in accordance with Eq. 5 above.

The AEV processor 136 of the FIG. 5 embodiment comprises an AEN 144 configured to perform a convolutional encoding/decoding of an enlarged sample area 119 within the captured image 115, wherein the enlarged sample area 119 corresponds to a plurality of different sets of image data 117 (as if the classifier network were "slid" to spatial positions within the enlarged sample area 119). In FIG. 5, the AEN 144 may be configured to validate detection of character '6' and, as such, is labeled as AEN 144 {'6'}. The AEN 144 {'6'} may be configured to validate a CCR 128 for character 108 '6' in accordance with the CVD 142{'6'}, as disclosed herein.

The AEN 144 {'6'} may comprise an encoder 152 and a decoder 154. The encoder 152 may comprise a plurality of encode layers 153 (encode layers 153A-N), and the decoder 154 may comprise a plurality of decode layers 155 (decode layers 155A-N). The layers 150 may comprise respective filter layers 551/556. The filters of each filter layer 551/556 comprise a neuron of a corresponding layer 150 (e.g., neurons of respective encode or decode layers 153/155). The first encode filter layer 551 may comprise a plurality of two-dimensional convolutional filters (e.g., the neurons of the first encode layer 153A may be configured to produce respective two-dimensional representations of the enlarged sample area 119 within the captured image 115, as illustrated in FIG. 5). Subsequent encode filter layers 551B-N (and decode filter layers 556N-A) may comprise one-dimensional convolutional filters (e.g., the neurons of encode layers 153B-N and decode layers 153A-N may be configured to generate one-dimensional representations of their respective inputs). The layers 150 may further comprise convolution layers 559 configured to implement convolutional transforms on outputs of respective filter layers 551/556 (each convolutional layer 559 operating on outputs generated by a preceding filter layer 551/556, as illustrated in FIG. 5).

In the FIG. 5 embodiment, the first encode filter layer 551A of the first encode layer 153A may comprise 100 two-dimensional convolutional filters, each convolutional filter comprising a neuron of the first encode layer 153A. The outputs of the convolutional filters 551A may comprise convolutional kernels of the convolution layer 559A. The resulting convolution output volumes may flow to the one-dimensional convolutional filters of the second encode filter layer 551B, and so on, with the convolution layer 559N of the last encode layer 153N receiving outputs produced by the one-dimensional convolutional filters of the last encode layer 153N of the encoder 152.

The convolution volumes output of convolution layer 559N/569N may flow to the one-dimensional convolutional filters of the first decode filter layer 556N (of the first decode layer 153N). The convolutional output volumes of convolution layer 5690N-1 may flow to the one-dimensional convolutional filters of the second decode filter layer 569N-1, and so on, with the outputs of the convolutional filters of the last decode filter layer 556A forming one-dimensional convolutional output volumes of the reconstruction volume 557. As disclosed above, the reconstruction volume 557 may a three-dimensional object comprising the two-dimensional output matrix of the convolution performed through the layers 150 of the FIG. 5 AEN 144 and, at each location therein, the one-dimensional reconstruction of the input (the enlarged sample area 119 within the captured image 115).

In some embodiments, the reconstruction volume 557 comprises m reconstructed images 157, each reconstructed image 157 corresponding to a respective input image data 117 at a respective spatial location within the enlarged sample area 119. The difference engine 539 may be configured to determine reconstruction errors 559[m] corresponding to each of the m reconstructed images 157[m], and may use a minimum of the reconstruction errors 559[m] as the reconstruction error 159 for the CCR 128. The AEV processor 136 may determine whether the CCR 128 comprises a true positive for the target character 145 '6' based on the determined reconstruction error 159, as disclosed herein. Alternatively, in some embodiments, the reconstruction volume 557 comprises a plurality of predictions (determined in accordance with Eq. 5), and the determination of whether the CCR 128 comprises a true positive for the target character 145 '6' may be based on one or more of the predictions of the reconstruction volume 557.

Referring back to FIG. 1A, the OCR verification engine 132 and/or AEV processor 136 may be used to validate and/or filter OCR data 126 produced by the OCR engine 122. In some embodiments, the OCR verification engine 132 validates and/or filters OCR data 126 at an output stage of the image processing system 112 (e.g., prior to the OCR classification results being output from the image processing system 112). Alternatively, or in addition, the OCR verification engine 132 may be configured to validate and/or filter internal OCR data 126 and/or OCR data 126 produced and/or used within different respective stages of the OCR classification engine 122.

Figure 6:
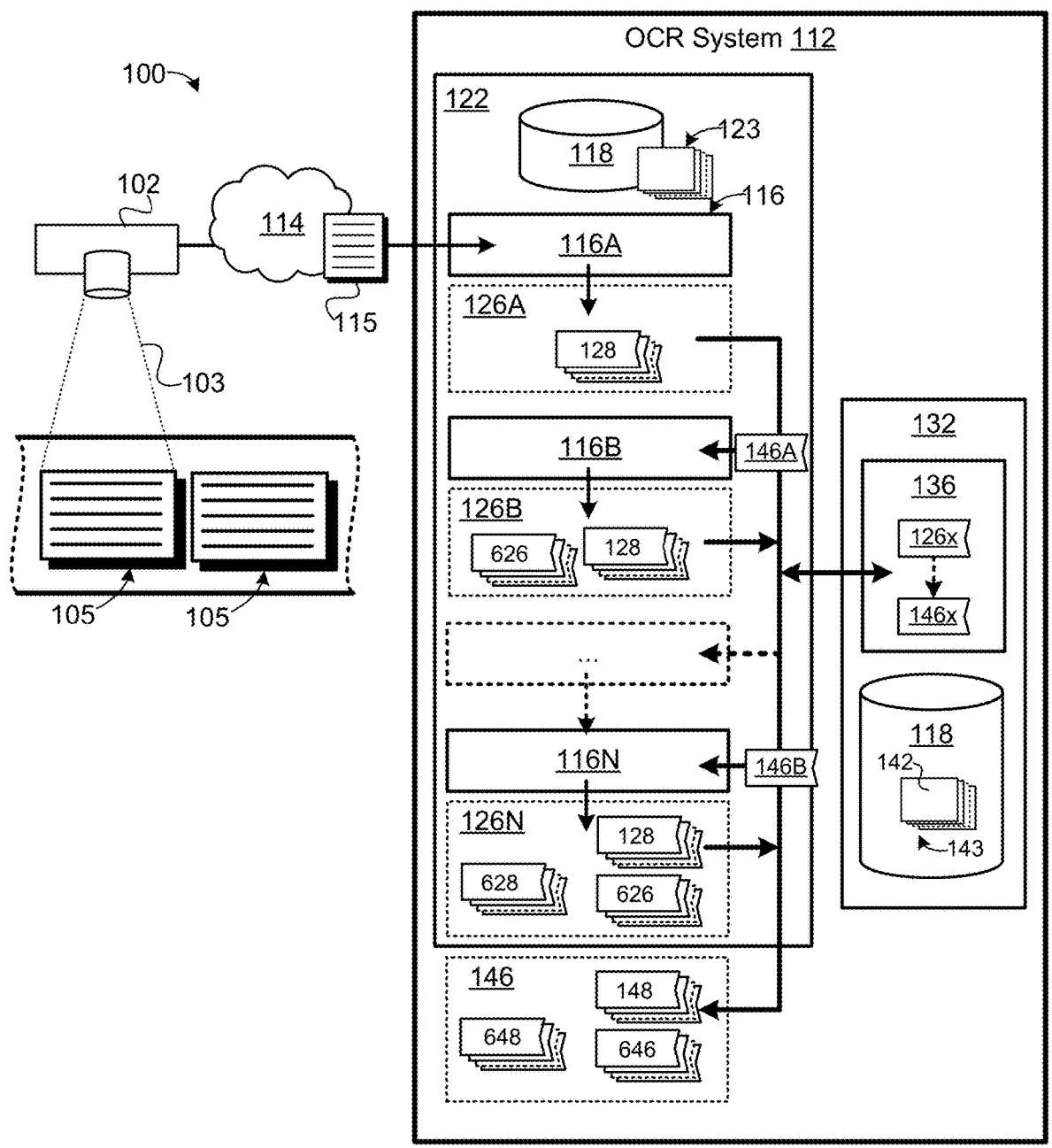
FIG. 6 is a schematic block diagram of an OCR system, according to at least one illustrated embodiment.

FIG. 6 is a schematic block diagram of one embodiment of an OCR system 100 comprising an OCR verification engine 132. The OCR classification engine 122 of the image processing system 112 comprises a plurality of processing units and/or stages 116, which may include, but are not limited to: a character recognition stage 116A, a line recognition stage 116B, and so on, including a word recognition stage 116N. Each stage 116A-N may be configured to produce respective OCR data 126A-N, including CCRs 128, as disclosed herein. The character recognition stage 116A may be configured to detect characters in a captured image 115, as disclosed herein. The OCR data 126A generated by the character recognition stage 116A may comprise CCRs 128 corresponding to respective characters 108 detected within the captured image 115.

The OCR data 126A may flow to the line recognition stage 116B, which may be configured to detect lines within the captured image 115 (using the OCR data 126A produced by stage 116A). As used herein, "line detection" refers to detection of a collection of characters 108 within the captured image 115 (e.g., detecting a line of text). The OCR data 126B generated by the line detection stage 116B may comprise line detection data 626, which may comprise information pertaining to lines detected within the captured image 115 and may include, but is not limited to: labels of respective lines, image coordinates of respective lines, CCRs 128 corresponding to characters of respective lines, and so on. The line detection stage 116B may remove CCRs 128 that do not correspond to a line. As such, the OCR data 126B may comprise fewer CCRs 128 than the OCR data 126A.

The string recognition stage 116N may be configured to recognize words and/or strings within the captured image 115 (by use of the OCR data 126 produced by preceding stages 116, such as the OCR data 126B produced by the line recognition stage 116B). The OCR results 126N produced by the string recognition stage 116N may comprise string classification data 628, which may comprise information pertaining to the words and/or strings detected within the captured image 115. The string classification data 628 may include, but is not limited to: label(s) corresponding to detected words and/or strings, semantics pertaining to the words and/or strings (e.g., links and/or references to an ontology or other data structure), links and/or references to the lines and/or characters 108 comprising the words and/or strings, and so on. The string classification data 628 may further comprise line detection data 626 and CCRs 128. Lines and/or characters that do not correspond to words and/or strings may be removed from the OCR data 126N. As such, the OCR data 126N may comprise fewer line detections and/or CCRs 128 than the OCR data 126 of preceding stages 116.

The OCR verification engine 132 may be configured to validate and/or filter the OCR data 126 generated and/or used by any of the stages 116 of the OCR engine 122 (e.g., any OCR data 126$x$). The OCR verification engine 132 may validate and/or filter the CCRs 128 of the OCR data 126$x$ to produce corresponding verified OCR data 146$x$. The verified OCR data 146$x$ may remove CCRs 128 of the OCR data 126$x$ determined to be false positives, as disclosed herein, which may comprise, inter alia: a) using the AEV processor 136 to determine a reconstruction error 159 for the CCR 128, and b) comparing reconstruction error 159 to a threshold, as disclosed herein. CCRs 128 determined to be false positives may be removed from the resulting verified OCR data 146$x$. The verified OCR data 146$x$ may flow back to the OCR classification engine 122, which may use the OCR data 146$x$ in a next stage 116 (in place of the OCR data 126 produced by the preceding stage 116 thereof).

In some embodiments, the OCR verification engine 132 is configured to validate and/or filter OCR data 126A produced by the character recognition stage 116A to thereby produce corresponding verified OCR data 146A. The verified OCR data 146A may be used by subsequent stages 116B-N of the OCR classification engine 122, such as the line recognition stage 116B. The initial set of OCR data 126A produced at the character recognition stage 116A may comprise a large number of false positives. As such, validating and/or filtering the OCR data 126A may improve the accuracy and efficiency of the subsequent stages 116B-N (by virtue of removal of the false positives from the OCR data 126A). Verification of the OCR data 126A may be computationally expensive, however, due to the large number of CCRs 128 included therein as compared to the OCR data 126B-N produced by subsequent stages 116B-N. As such, in some embodiments, the OCR verification engine 132 may not validate and/or filter the OCR data 126A produced by the character recognition stage 116A. In such embodiments, the OCR data 126A produced at the character recognition stage 116A (including the false positive CCRs 128) may flow to the line detection stage 116B.

The OCR verification engine 132 may be further configured to validate OCR data 126B generated by the line recognition stage 116B. Validating the OCR data 126B may comprise removing and/or identifying false positives within the CCRs 128. The resulting validated OCR data 146B may be used in subsequent stages 116, such as the string recognition stage 116N. As disclosed above, the OCR data 126B may comprise a larger number of CCRs 128 than subsequent stages 116 and, as such, validating the OCR data 126B may be more computationally expensive than validating OCR data 126 produced by such subsequent stages 116. Therefore, in some embodiments, the OCR classification engine 122 may not use the OCR verification engine 132 to validate and/or filter the OCR data 126B.

The OCR verification engine 132 may be further configured to validate OCR data 126N generated by the string recognition stage 116N. The string recognition stage 116N may comprise a last (or nearly last) stage 116 of the OCR classification engine 122. Accordingly, the OCR data 126N may comprise fewer CCRs 128 than the OCR data 126 of earlier stages 116. As a result, validating and/or filtering the OCR data 126N may impose less computational overhead than validating and/or filtering the OCR data 126 of such preceding stages 116. The preceding stages 116, however, may not have the benefit of reduced false positives in the OCR data 126 used thereby and, as such, may operate less efficiently and with a higher incidence of errors than if the validation and/or filtering were performed at an earlier stage 116. The OCR validation engine 132 may be configured to validate and/or filter the string classification data 628, line classification data 626, and/or CCRs 128 (by removing false positives and/or disambiguating conflicting CCRs 128, as disclosed herein). The validated OCR data 146N may flow to subsequent stages 116 (if any) and/or output from the image processing system 112.

Figure 7:
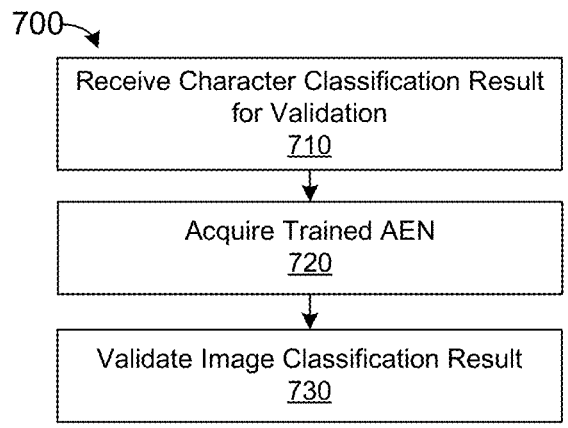
FIG. 7 is a flow diagram of one embodiment of a method for improving the accuracy and/or robustness of OCR, as disclosed herein.

FIG. 7 is a flow diagram of one embodiment of a method 700 for improving the accuracy and/or robustness of an OCR system 100, as disclosed herein. One or more steps of the method 700 (and/or the other methods disclosed herein) may be embodied as instructions, modules, executable code, and/or the like, stored on a non-transitory computer-readable storage medium. The instructions may be configured to cause a computing device to perform the processing steps and/or operations disclosed herein. Alternatively, or in addition, one or more of the steps of the method 700 (and/or the other methods disclosed herein) may be embodied and/or implemented by hardware components, such as a circuit, ASIC, microprocessor, DSP, GPU, FPGA, and/or the like.

Step 710 may comprise receiving a CCR 128 at an OCR verification engine 132. The CCR 128 may comprise detection of a particular character 108 at a specified location within a captured image 115. In some embodiments, step 710 comprises generating the CCR 128 by use of an OCR classification engine 122, as disclosed herein. The CCR 128 may comprise any suitable data pertaining to detection and/or classification of a character 108 within a captured image 115, which may include, but is not limited to: information pertaining to the detected character 108, such as an identifier of the detected character 108, a label, a human-readable label (e.g., label "A" for detection of the character 'A'), a character code (e.g., a Unicode representation of the character), a location of the detected character 108 within the captured image 115 (e.g., coordinates, height and width, a bounding box, and/or the like), the region of the captured image 115 in which the character 108 was detected (an image patch or crop from the captured image 115), quality metrics, confidence metrics, references and/or links to conflicting CCR 128, and/or the like.

Step 720 may comprise acquiring an AEN 144 configured for validation of the CCR 128 received at step 710. Step 720 may comprise selecting the AEN 144 from a plurality of trained AEN 144, each AEN trained to validate a respective target character 145. Step 720 may comprise selecting the AEN 144 in response to determining that the selected AEN 144 is trained to validate a target character 145 corresponding to the character 108 of the CCR 128. Alternatively, or in addition, step 720 may comprise selecting a CVD 142 for use in configuring an AEN 144 (and/or AEV processor 142) to validate the CCR 128. Step 720 may comprise selecting the CVD 142 from a plurality of CVD 142, each CVD 142 adapted to configure an AEN 144 and/or AEV processor 136 to validate detection and/or classification of a respective target character 145. The selection of step 720 may comprise selecting a CVD 142 configured for validation of a target character 145 corresponding to the character 108 of the CCR 128. Step 720 may further comprise configuring an AEN 144 to implement the selected CVD 142, which may configure the AEN 144 to validate character 108 of the CCR 128, as disclosed herein. The CVD 142 may comprise weights, parameters, and/or other configuration information adapted to configure respective layers 150 of an AEN 144 to validate a target character 145 corresponding to the CCR 128. The CDV 142 may further comprise one or more thresholds for distinguishing true positives of the target character 145 from false positives (e.g., thresholds pertaining to reconstruction errors 159 between image data of the CCR 128 and corresponding reconstructed image 157 produced by the AEN 144).

Step 730 may comprise verifying the CCR 128 by use of the trained AEN 144 acquired at step 720. Step 730 may comprise: a) obtaining image data 117 corresponding to the CCR 128; b) using the AEN 144 to a generate reconstructed image 157 corresponding to the image data 117; c) determining a reconstruction error 159 between the input image data 117 and the reconstructed image 157; and d) determining whether to validate the CCR 128 based on the reconstruction error 159.

Obtaining the image data 117 at step 730 may comprise obtaining an crop, patch, section, and/or region of the captured image 115 in which the character 108 was detected. The image data 117 may be acquired such that a size of the input image data 117 corresponds to a size of the ground-truth images of the training data 168 used to train the AEN 144 (and/or learn the CVD 142). The input image data 117 may be acquired such that a position, orientation, and/or scale of the particular character 108 detected therein corresponds to a position, orientation, and/or scale of the particular character 108 in the training entries 167 of the training data 168.

Generating the reconstructed image 157 at step 730 may comprise encoding the input image data 117 by use of an encoder 152 of the AEV processor 136, as disclosed herein. Encoding the input image data 117 may comprise processing the input image data 117 through a plurality of encoder layers 153, each encode layer 153 configured to produce a compressed and/or reduced dimensionality version of an input thereto, and comprising a respective neural network (e.g., processing the input image data 117 through encode layers 153A-N, as disclosed herein). In some embodiments, the encoding of step 730 comprises: processing the input image data 117 by a first encode layer 153A having a neural network comprising 100 neurons; processing an output of the first encode layer 153A by a second encode layer 153B having a neural network comprising 50 neurons; and processing an output of the second encode layer 153B by a third encode layer 153N having a neural network comprising 25 neurons. The output of the third encode layer 153 may comprise an inner layer representation 147 of the input image data 117 (e.g., may comprise an encoded, compressed, and/or reduced dimensionality representation of the input image data 117).

Generating the reconstructed image 157 may further comprise decoding the inner layer representation 147 of the input image data 117 by use of a decoder 154 of the AEV processor 136. The decoding may comprise processing the inner layer representation 147 by a plurality of decode layers 155, each decode layer 155 configured to produce a decompressed and/or expanded reconstruction of an input thereto, and comprising a respective neural network (e.g., processing the inner layer representation 147 through decode layers 155N-A, as disclosed herein). In some embodiments, the decoding of step 730 comprises: processing the inner layer representation 147 by a first decode layer 155N having a neural network comprising 25 neurons; processing an output of the first decode layer 153A by a second decode layer 153B having a neural network comprising 50 neurons; and processing an output of the second encode layer 153B by a third decode layer 153N having a neural network comprising 100 neurons. The output of the third decode layer 153N may comprise the reconstructed image 147 corresponding to the input image data 117. In some embodiments the encode layer 153N and the decode layer 155N may comprise a same layer (a same neural network comprising a same set of neurons).

Determining the reconstruction error 159 between the input image data 117 and the reconstructed image 157 may comprise identifying and/or quantifying differences between the input image data 117 and the reconstructed image 157 (e.g., by calculating pixel-by-pixel differences and/or an RMS error between the input image data 117 and the reconstructed image 157, as disclosed herein). Determining whether to validate the CCR 128 at step 730 may comprise comparing the reconstruction error 159 to one or more thresholds, as disclosed herein. The thresholds may be determined during training of the AEN 144 (and/or development of the CVD 142), as disclosed herein.

In some embodiments, step 730 comprises determining a plurality of reconstruction errors 159 for the CCR 128, each reconstruction error 159 corresponding one of a plurality of different sets of input image data 117 in an enlarged sample area 119. The enlarged sample area 119 may correspond to a size of one or more training images (e.g., ground-truth images) used to train the AEN 144 (and/or determine the CVD 142 implemented by the AEN 144). The enlarged sample area 119 may correspond to about ½ the width and/or height of the training images. Step 730 may further comprise identifying a minimum reconstruction error 159 of the plurality of reconstruction errors 159, and determining whether the CCR 128 is a true positive based on the identified minimum reconstruction error 159 (e.g., as disclosed above in conjunction with FIGS. 4A and 4B). Alternatively, in some embodiments, step 730 comprises implementing a single forward pass through a plurality of convolutional layers configured to determine reconstruction errors 159 (and/or label predictions) for a plurality of spatial locations within the enlarged sample area 119 (e.g., as disclosed above in conjunction with FIG. 5).

Figure 8:
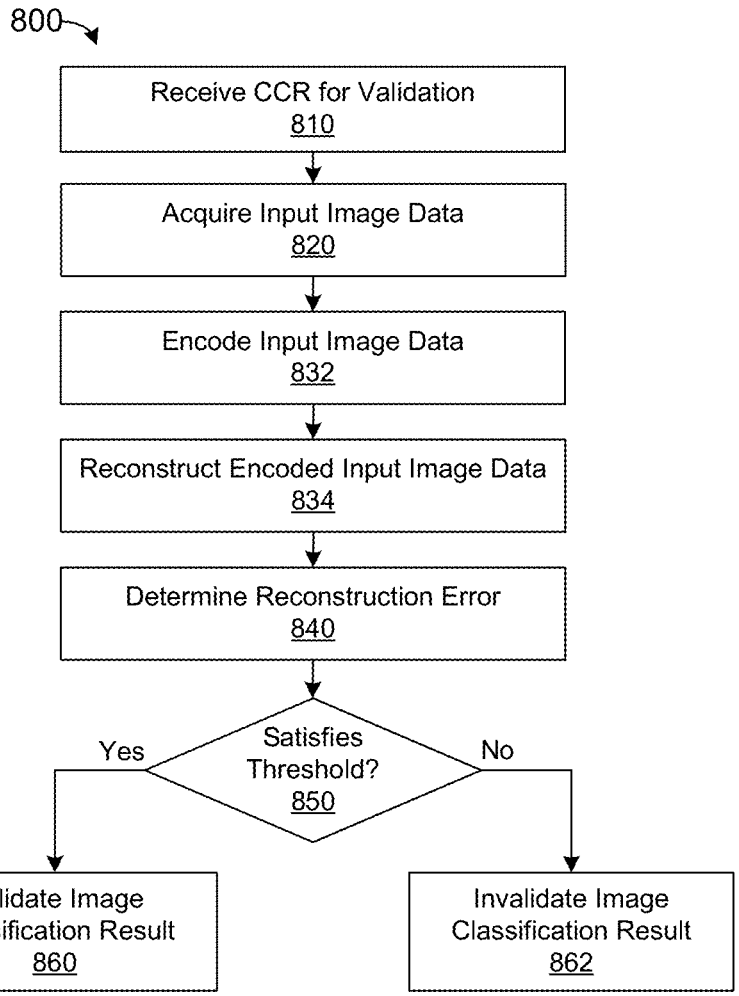
FIG. 8 is a flow diagram of another embodiment of a method for improving the accuracy and/or robustness of OCR, as disclosed herein.

FIG. 8 is another embodiment of a method 800 for improving the accuracy and/or robustness of an OCR system 100, as disclosed herein. Step 810 may comprise receiving a CCR 128 for validation, and step 820 may comprise acquiring image data 117 corresponding to the CCR 128, as disclosed herein.

Steps 832-850 may comprise validating the CCR 128 by use of a AEN 114 (and/or AEV processor 136), as disclosed herein. Step 832 may comprise encoding the acquired image data 117 to produce a corresponding IRL 147. Step 832 may comprise encoding the acquired image data 117 by use of an encoder 152 of an AEN 144 trained to reproduce the character 108 of the CCR 128. Step 832 may comprise selecting the AEN 144 from a plurality of AEN 144, each AEN 144 trained to validate a respective target character 145) and/or configuring the AEN 144 to implement CVD 142 corresponding to the character 108 of the CCR 128. Step 832 may comprise processing the input image data 117 by an encoder 152 of the AEN 144, as disclosed herein (e.g., processing the input image data 117 through a plurality of encoder layers 152).

Step 834 may comprise reconstructing the encoded input image data (e.g., generating reconstructed image 157 from the IRL 147 produced from the acquired image data 117). Step 834 may comprise processing the IRL 147 of the acquired image data 117 by a decoder 154 of the AEN 144, as disclosed herein (e.g., processing the IRL 147 through a plurality of decode layers 155N-A).

Step 840 may comprise determining a reconstruction error 159 between the acquired image data 117 and the reconstructed image 157. The reconstruction error 159 may comprise an RMS error, as disclosed herein. Step 850 comprises determining whether the reconstruction error 159 determined at step 840 satisfies a validation threshold (e.g., is less than or equal to the validation threshold). If the reconstruction error 159 satisfies the validation threshold, the flow continues at step 860; otherwise, the flow continues at step 862. The validation threshold may be defined in CVD 142 of the AEN 144 (e.g., may be determined during training of the AEN 144 and/or development of the CVD 142, as disclosed herein).

Step 860 comprises validating the image classification result 128. Step 860 may comprise validating the image classification result 128 by any suitable means including, but not limited to: marking the image classification result 128 as valid and/or a true positive, retaining the CCR 128 in OCR data 126 (e.g., within OCR data 126A-N), and/or the like. Step 862 comprises invalidating the CCR 128. Step 862 may comprise invalidating the image classification result 128 by any suitable means including, but not limited to: marking the image classification result 128 as invalid and/or as a false positive, removing the character classification from the OCR data 126 (and/or OCR data 126A-N), and/or the like, as disclosed herein.

Figure 9:
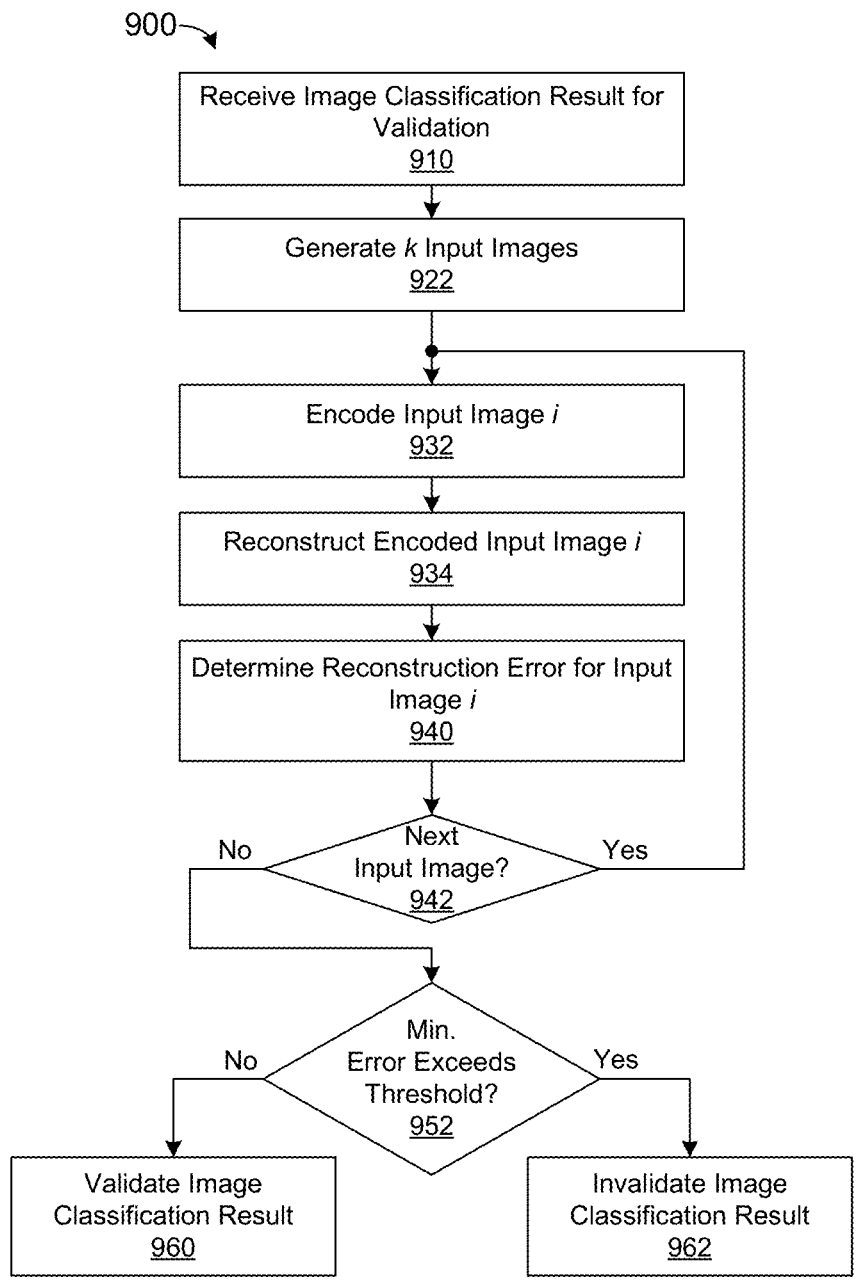
FIG. 9 is a flow diagram of one embodiment of a method for validating OCR results based on a plurality of input images at different respective spatial locations.

FIG. 9 is another embodiment of a method 900 for improving the accuracy and/or robustness of an OCR system 100, as disclosed herein. Step 910 may comprise receiving a CCR 128 for validation, as disclosed herein. Step 922 may comprise generating a plurality of sets of image data 117 corresponding to the CCR 128 (e.g., k different sets of input image data 117). The plurality of input images 117[*k*] may comprise a plurality of different crops, patches, sections, and/or regions of the captured image 115, as disclosed herein. Step 922 may comprise generating input image data 117[*k*] by, inter alia, sliding a window within an enlarged area within the captured image 115 (e.g., as disclosed in conjunction with FIGS. 4A and 4B). Step 922 may further comprise rotating, scaling, and/or transforming one or more of the sets of input image data 117[*k*], as disclosed herein. The method 900 may comprise processing each set of input image data 117[*k*], which may comprise processing each set of input image data[i] where i ranges from 0 to k−1 through steps 932-940. In some embodiments, each set of input image data [k] may be processed iteratively and/or in sequence by a selected AEV processor 136. Alternatively, one or more of the sets of input image data 117[*k*] may be processed concurrently and/or in parallel (e.g., by the selected AEV processor 136 and/or a plurality of AEV processors 136). Processing a particular set of input image data 117[*i*] may comprise: encoding the input image data 117[*i*] at step 932, reconstructing the encoded input image data 117[*i*] at step 934, and determining a reconstruction error for the input image data 117[*i*] at step 940 (e.g., a reconstruction error 159 between the image data 117 and the reconstructed image 157), as disclosed herein. Step 942 may comprise determining whether any of the sets of image data 117[*k*] remain to be processed (e.g., whether i≤k). If a next set of image data 117[*i*+1] remains to be processed, steps 932-940 may be performed on the next set of image data 117[*i*+1]; otherwise, the flow may continue at step 952.

Step 952 may comprise determining whether to validate the CCR 128 based on, inter alia, the reconstruction error(s) of one or more of the sets of input image data 117[*k*]. Step 952 may comprise identifying the minimum reconstruction error of the plurality of sets of input image data 117[*k*] (e.g., minimum RMS error $e_{rms\_min}$), and determining whether the minimum reconstruction error exceeds an error threshold. If the minimum reconstruction error exceeds the threshold, the CCR 128 may be invalidated at step 962; otherwise, the CCR 128 may be validated at step 960.

Figure 10:
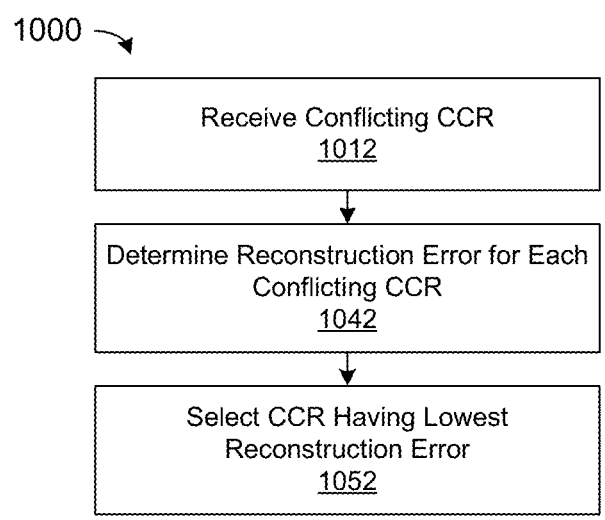
FIG. 10 is a flow diagram of one embodiment of a method for disambiguating between conflicting character classifications.

FIG. 10 is another embodiment of a method 1100 for improving the accuracy and/or robustness of an OCR system 100, as disclosed herein. Step 1012 may comprise receiving two or more conflicting CCR 128. The conflicting CCR 128 may comprise CCR 128 pertaining to same and/or overlapping region within an input image, each CCR 128 comprising a detection of a different character 108 within the same and/or overlapping region. Step 1012 may comprise determining the conflicting CCR 128 in an OCR process implemented by, inter alia, the OCR engine 122.

Step 1032 may comprise determining a reconstruction error 159 for each CCR received at step 1012. Step 1032 may comprise determining reconstruction errors 159 for respective CCR 128, as disclosed herein (e.g., as disclosed in conjunction with FIGS. 7-9). Step 1052 may comprise selecting a CCR 128, from the plurality of conflicting CCR 128, having a lowest reconstruction error. The selection may be used to disambiguate between the conflicting CCR 128, as disclosed herein. The selected CCR 128 may be retained in OCR data 126 and CCR 128 other than the selected CCR 128 may be removed from the OCR data 126. The operations of methods 700-100 disclosed above may be implemented in conjunction with one or more stages 116 of an OCR process (e.g., a character recognition stage 116A, a line recognition stage 116B, and a word recognition stage 116N, as disclosed above in conjunction with FIG. 6).

In the disclosure, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with optical character recognition systems, server computers, and/or communications networks have not been shown or described in detail to avoid unnecessarily obscuring descriptions of the embodiments.

Unless the context requires otherwise, as used herein, the word "comprise" and variations thereof, such as, "comprises" and "comprising" are to be construed in an open, inclusive sense, that is as "including, but not limited to."

As used herein, "one embodiment" or "an embodiment" means that a particular feature, structure or characteristic described in connection with the embodiment is included in at least one embodiment. Thus, the appearances of the phrases "in one embodiment" or "in an embodiment" herein are not necessarily all referring to the same embodiment. Furthermore, the particular features, structures, or characteristics may be combined or assembled in any suitable manner in one or more embodiments.

As used herein, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

We claim:

1. A method of operation in an image processing system for recognizing one or more characters in an image, the method comprising:
    receiving a classifier result indicating detection of a character at specified coordinates within the image;
    retrieving input image data corresponding to the specified coordinates within the image;
    generating a reconstruction of the input image data by use of an auto-encoder trained to replicate the detected character; and
    determining whether the classifier result is a true positive based on a reconstruction error between the input image data and the reconstruction of the input image data, wherein generating the reconstruction of the input image data comprises:
    processing the input image data through a plurality of encoder layers of the auto-encoder to produce an inner layer representation of the input image data; and
    decoding the inner layer representation by use of a plurality of decoder layers of the auto-encoder to generate the reconstruction of the input image data from the inner layer representation.

2. The method of claim 1, further comprising calculating the reconstruction error between the input image data and reconstructed image data generated by the auto-encoder.

3. The method of claim 2, wherein calculating the reconstruction error comprises computing a root-mean-square error between the input image data and the reconstructed image data.

4. The method of claim 1, further comprising invalidating the classifier result in response to the reconstruction error exceeding a determined verification threshold.

5. A method of operation in an image processing system for recognizing one or more characters in an image, the method comprising:
    receiving a classifier result indicating detection of a character at specified coordinates within the image;
    retrieving input image data corresponding to the specified coordinates within the image;
    generating a reconstruction of the input image data by use of an auto-encoder trained to replicate the detected character;
    determining whether the classifier result is a true positive based on a reconstruction error between the input image data and the reconstruction of the input image;
    acquiring a plurality of different sets of input image data corresponding to the classifier result;
    generating a plurality of reconstruction images by use of the auto-encoder, each reconstruction image corresponding to a respective one of the different sets of input image data;
    calculating a plurality of reconstruction errors, each reconstruction error between a respective one of the different sets of the input image data and corresponding reconstruction image; and
    determining whether the classification result comprises a true positive based on a minimum reconstruction error of the plurality of reconstruction errors.

6. The method of claim 5, wherein generating the plurality of different sets of input image data comprises retrieving respective sets of input image data from the image within an enlarged area around the specified coordinates, the enlarged area corresponding to a size of one or more ground-truth images used to train the auto-encoder.

7. A method of operation in an image processing system for recognizing one or more characters in an image, the method comprising:
    receiving a classifier result indicating detection of a character at specified coordinates within the image;
    retrieving input image data corresponding to the specified coordinates within the image;
    generating a reconstruction of the input image data by use of an auto-encoder trained to replicate the detected character;
    determining whether the classifier result is a true positive based on a reconstruction error between the input image data and the reconstruction of the input image;

invalidating the classifier result in response to the reconstruction error exceeding a determined verification threshold; and determining the reconstruction error based on reconstruction errors of one or more ground-truth images used to train the auto-encoder.

8. An image processing system, comprising:
an auto-encoder processor, comprising:
   a plurality of encode layers configured to generate a compressed representation of input image data corresponding to a character classification result,
   a plurality of decode layers configured to generate a reconstructed image from the compressed representation of the input image data, and
   a difference calculator configured to determine a reconstruction error between the input image data and the reconstructed image,
wherein the auto-encoder processor is configured to determine whether the character classification result is one of a true positive and a false positive based on the reconstruction error.

9. The system of claim 8, wherein:
each encode layer of the plurality of encode layers comprises a respective neural network comprising a plurality of neurons; and
each decode layer of the plurality of decode layers comprises a respective neural network comprising a plurality of neurons.

10. The system of claim 9, wherein:
each neuron of a first encode layer of the plurality of encode layers comprises a two-dimensional convolutional filter, and
each neuron of the encode layers other than the first encode layer comprises a one-dimensional convolutional filter.

11. The system of claim 9, wherein:
the plurality of encode layers comprises a first encode layer comprising a first number of neurons, and second encode layer comprising a second number of neurons, and a third encode layer comprising a third number of neurons;
the first number is larger than the second number; and
the second number is larger than the third number.

12. The system of claim 9, wherein:
the plurality of decode layers comprises a first decode layer comprising a first number of neurons, and second decode layer comprising a second number of neurons, and a third decode layer comprising a third number of neurons;
the third number is larger than the second number; and
the second number is larger than the first number.

13. The system of claim 8, wherein:
the auto-encoder processor is configured to invalidate the character classification result in response to determining that the character classification result is a false positive;
invalidating the character classification result comprises one or more of: removing the character classification result from result data, marking the character classification result as a false positive, and recording that the character classification result is a false positive on a non-transitory storage medium.

14. The system of claim 8, further comprising an auto-encoder network configuration engine adapted to train the encode layers and the decode layers to replicate a target character, the target character corresponding to a character of the character classification result.

15. The image processing system of claim 8, further comprising an image capture device operably coupled with the auto-encoder processor and configured to capture the input image data.

16. A non-transitory computer-readable storage medium comprising instructions configured to cause a computing device to perform operations for improving accuracy of a character recognition system, the operations comprising:
receiving a detection result indicating detection of a character at a designated location within a captured image;
acquiring input image data corresponding to the designated location within the captured image;
configuring an auto-encoder network to replicate a target character corresponding to the character of the detection result;
reconstructing an encoding of the input image data by use of a decoder of the auto-encoder network to produce a reconstructed image;
calculating a reconstruction error between the input image data and the reconstructed image; and
invalidating the detection result in response to the reconstruction error failing to satisfy a determined threshold.

17. The non-transitory computer-readable storage medium of claim 16, the operations further comprising encoding the input image data by use of a plurality of encode layers, each encode layer comprising a respective neural network.

18. The non-transitory computer-readable storage medium of claim 17, wherein:
each neuron of each encode layer comprises a convolutional filter; and
the convolutional filters of an input encode layer of the plurality of encode layers comprise two-dimensional convolutional filters.

19. The non-transitory computer-readable storage medium of claim 18, wherein:
the decoder comprises a plurality of decode layers; and
each neuron of each decode layer comprises a one-dimensional convolutional filter.

20. The non-transitory computer-readable storage medium of claim 18, wherein configuring the auto-encoder network to replicate the target character comprises:
generating reconstructed images from plurality of training images by use of the auto-encoder network, each training image comprising a visual representation of the target character;
determining reconstruction errors in response to the generating, each reconstruction error comprising a root-mean-square difference between a respective training image and a corresponding reconstructed image; and
learning a configuration of each of a plurality of layers of the auto-encoder network, the learning configured to minimize the determined reconstruction errors.

\* \* \* \* \*